US010332297B1

(12) United States Patent
Vadodaria

(10) Patent No.: US 10,332,297 B1
(45) Date of Patent: Jun. 25, 2019

(54) ELECTRONIC NOTE GRAPHICAL USER INTERFACE HAVING INTERACTIVE INTELLIGENT AGENT AND SPECIFIC NOTE PROCESSING FEATURES

(71) Applicant: Vishal Vadodaria, Fairfax, VA (US)

(72) Inventor: Vishal Vadodaria, Fairfax, VA (US)

( * ) Notice: Subject to any disclaimer, the term of this patent is extended or adjusted under 35 U.S.C. 154(b) by 0 days.

(21) Appl. No.: 14/846,247

(22) Filed: Sep. 4, 2015

(51) Int. Cl.
| *G06T 13/40* | (2011.01) |
| *G06F 3/0481* | (2013.01) |
| *G06F 3/0486* | (2013.01) |
| *G06F 3/0488* | (2013.01) |
| *G06F 3/16* | (2006.01) |

(52) U.S. Cl.
CPC ............ *G06T 13/40* (2013.01); *G06F 3/0486* (2013.01); *G06F 3/04812* (2013.01); *G06F 3/04817* (2013.01); *G06F 3/04883* (2013.01); *G06F 3/167* (2013.01)

(58) Field of Classification Search
CPC ............ G06T 13/40; G06F 3/041–047; G06F 3/048–04897; G06F 2203/04808
See application file for complete search history.

(56) References Cited

U.S. PATENT DOCUMENTS

| 2008/0126095 | A1* | 5/2008 | Sideman | G06F 3/167 704/260 |
| 2011/0216075 | A1* | 9/2011 | Shigeta | G06F 3/048 345/473 |
| 2012/0315881 | A1* | 12/2012 | Woloshyn | G06F 3/0488 455/412.2 |
| 2015/0066479 | A1* | 3/2015 | Pasupalak | G06F 17/27 704/9 |
| 2015/0186351 | A1* | 7/2015 | Hicks | G06F 17/241 715/232 |

OTHER PUBLICATIONS

Akenine-Moller, Thomas and Eric Haines. "Real-time rendering." 2nd ed. (2002), pp. 669-678. (Year: 2002).*

* cited by examiner

*Primary Examiner* — Daniel F Hajnik
(74) *Attorney, Agent, or Firm* — Juneau & Mitchell; Todd Juneau

(57) ABSTRACT

The invention relates to an electronic note graphical user interface that has a human-like interactive intelligent animated agent and provides specific note processing features including multimodal hands free operation, and includes methods and systems that include a processor configured to provide an Intelligent Interactive Agent as a graphic animation to a user, where the agent receives and processes verbal commands from the user to operates the GUI and executes GUI operations including showing the animation tapping, swiping, pinching, searching for text, entering text, and displaying retrieved content, in the one or more mobile electronic display notes displayed in the container display matrix.

12 Claims, 41 Drawing Sheets

ELECTRONIC NOTE GRAPHICAL USER INTERFACE HAVING INTERACTIVE INTELLIGENT AGENT AND SPECIFIC NOTE PROCESSING FEATURES

STATEMENT REGARDING FEDERALLY SPONSORED RESEARCH

No federal government funds were used in researching or developing this invention.

CROSS REFERENCE TO RELATED APPLICATIONS

There are no related applications which are hereby cross-referenced.

NAMES OF PARTIES TO JOINT RESEARCH AGREEMENT

There are no additional parties related to this application subject to a joint research agreement.

REFERENCE TO A SEQUENCE LISTING

A table or a computer list appendix on a compact disc is not included herein.

FIELD OF THE INVENTION

The invention relates to systems and methods for managing the display of information in a mobile device. In particular, the invention relates to systems and methods of optimizing rendering requirements of a mobile electronic display note system by providing a Note Graphical User Interface (NGUI) application which includes specific processing features.

BACKGROUND OF THE INVENTION

Software applications for mobile devices have provided users with the option of creating electronic "sticky notes" as a way to mimic the successful functionality of actual self-adhesive note papers. However, electronic sticky notes are confined to the mobile application environment and as such are less convenient that traditional self-adhesive notes. This places a higher set of expectations on such electronic notes, and any difficulties that a user experiences can result in a failure to adopt such an application. Problems with readability, storage, display, battery life, and so forth can determine whether an application is a success or a failure. Accordingly, there is a need for systems and methods that can actively manage the experience that a user has with an electronic note and to manage the interaction between an electronic note and the background Note Graphical User Interface (NGUI) display environment upon which the electronic note is displayed.

BRIEF SUMMARY OF THE INVENTION

The invention relates to systems, mobile device applications, computer-readable storage media, and methods for reducing the rendering requirements of a mobile electronic display note (MEDN) system by providing a Note Graphical User Interface (NGUI) application which includes specific processing features. The Note GUI includes a mobile electronic display note (note) that is in or on a container display matrix (board).

In one preferred embodiment, there is provided a system for providing a Note Graphical User Interface (NGUI) application for handling electronic notes in a mobile device, comprising: a memory storing one or more programs configured to be executed by one or more processors, the one or more programs including instructions for: saving an mobile electronic display note rendering on a frame by frame basis; a processor configured to provide an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and the processor configured to provide optimal rendering of mobile electronic display note in a container display matrix while performing a drag & drop gesture; wherein during the Drag gesture, the mobile electronic display notes are rendered at frame rate that is calculated dynamically; wherein a checkpoint is set up in the container display matrix at every $1/T$th of a second, where T is the number of time units, and the checkpoints are assigned a value of milestones within a second; wherein at the end of every milestone $M_i$ where i ranges from 1 to T, a computation is performed as to how many frames/scenes to render to show the effect of animation within that milestone; wherein at every checkpoint i.e. milestone, a decision is made on the number of frames to render 'NF' within that milestone depending on the distance moved by the user during that milestone $D_i$ assuming a maximum distance Mpx that the user can move in the checkpoint ($1/T$th of a second): $NF=\text{ceil}((D_i/Mpx) \times (N_{max}/T))$; wherein T is assumed to be 10 initially and Mpx to be 100, as in we assume that the user can move a maximum distance of 100 px in $1/10$th of a second or 100 ms for which we need to render the maximum number of frames $N_{max}$; wherein $N_{max}$ is the maximum no. of frames that can be rendered in one second (typically, this is 60) and hence ($N_{max}/T$) represents the maximum number of frames that can be rendered in $1/T$ seconds; and wherein the ($D_i/Mpx$) is the ratio of $D_i$ to the maximum distance that the user can move in $1/T$th of a second.

In another preferred embodiment, there is provided a method of rendering one or more mobile electronic display notes, the steps comprising: (i) rendering one or more mobile electronic display notes on a frame by frame basis in a container display matrix; (ii) calculating a frame rate that the mobile electronic display notes are rendered and saving the frame to memory; (iii) receiving a drag and drop gesture from a user using a touchscreen and calculating a plurality of measurements of distance traveled over specified time periods; (iv) dynamically adjusting the frame by frame rendering rate based on the plurality of measurements of distance traveled over specified time periods, wherein the distance traveled is measured in pixels, wherein the frame by frame rendering rate is increased when the drag and drop gesture is accelerating, the frame by frame rendering rate is decreased when the drag and drop gesture is decelerating, and the frame by frame rendering rate is unchanged when the drag and drop gesture is stationary, wherein accelerating is calculated and determined when two or more of the plurality of measurements of distance traveled over specified time periods are decreasing nonlinearly, and wherein decelerating is calculated and determined when two or more of the plurality of measurements of distance traveled over specified time periods are increasing nonlinearly, and wherein stationary is calculated and determined when two or more of the plurality of measurements of distance traveled over specified periods are unchanged.

In another preferred embodiment, there is provided a system for providing a Note Graphical User Interface (NGUI) application for handling electronic notes in a mobile device, comprising: a memory storing one or more programs configured to be executed by one or more processors, the one or more programs including instructions for saving mobile electronic display note rendering on a frame by frame basis; providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and computing overlap of delta regions of a plurality of mobile electronic display notes displayed in a container display matrix, wherein the delta regions are defined as Area Revealed and Area Concealed of the mobile electronic display notes; and using the computation to update a relative depth measurement of the mobile electronic display notes defined as Z-indexes of the plurality of mobile electronic display notes computed in the previous animation frame/scene; wherein the computation provides an optimized and high performance updating of z-index; wherein an updated Z-index optimizes the rendering time leading to high performance; wherein computation avoids the redundancy of calculating the overlap of the current mobile electronic display note being dragged across the screen as well as the rest of the mobile electronic display notes present on the Note Graphical User Interface.

In another preferred embodiment, there is provided a method of computing overlap of delta regions of a plurality of mobile electronic display notes displayed in a container display matrix, comprising the steps of: (i) defining the delta regions as Area Revealed and Area Concealed of the mobile electronic display notes; and (ii) calculating a relative depth measurement of the mobile electronic display notes and defining the calculation as a Z-index for each of the plurality of mobile electronic display notes, wherein the computation provides an optimized and high performance updating of z-index; wherein an updated Z-index optimizes the rendering time leading to high performance; wherein computation avoids the redundancy of calculating the overlap of the current mobile electronic display note being dragged across the screen as well as the rest of the mobile electronic display notes present on the Note Graphical User Interface.

In another preferred embodiment, there is provided a system for providing a Note Graphical User Interface (NGUI) application for handling electronic notes in a mobile device, comprising: a memory storing one or more programs configured to be executed by one or more processors, the one or more programs including instructions for saving mobile electronic display note rendering data on a frame by frame basis; and providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and providing optimal rendering of a mobile electronic display note while performing a Pinch & Zoom gesture, wherein the rendering frame rate for the mobile electronic display note is dynamically calculated during the Pinch & Zoom gesture, wherein the Pinch & Zoom gesture comprises 4 rectangles of Area Concealed in case the mobile electronic display note is expanding, and wherein the Pinch & Zoom gesture comprises 4 rectangles of Area Revealed in case the mobile electronic display note is shrinking.

In another prefer embodiment, there is provided a method of rendering a mobile electronic display note while performing a Pinch & Zoom gesture, wherein the rendering frame rate for the mobile electronic display note is dynamically calculated during the Pinch & Zoom gesture, wherein the Pinch & Zoom gesture comprises 4 rectangles of Area Concealed in case the mobile electronic display note is expanding, and wherein the Pinch & Zoom gesture comprises 4 rectangles of Area Revealed in case the mobile electronic display note is shrinking.

In another preferred embodiment, there is provided a system for providing a Note Graphical User Interface (NGUI) application for handling electronic notes in a mobile device, comprising: a memory storing one or more programs configured to be executed by one or more processors, the one or more programs including instructions for saving mobile electronic display note rendering on a frame by frame basis; providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and Mapping text input to a mobile electronic display note, wherein an NLP Engine maps a text input given by a user to a mobile electronic display note; wherein verb words are linked to the Semantic Action; wherein common noun words resolve to a Semantic Concept/Entity for a category; wherein proper noun words resolve to Semantic Concept/Entity for proper items like names of people, places, organization and products.

In another preferred embodiment, there is provided a method of mapping text in a mobile electronic display note, comprising the step of mapping user inputted text in mobile electronic display note with an NLP Engine; wherein verb words are linked to the Semantic Action, wherein common noun words resolve to a Semantic Concept/Entity for a category, and wherein proper noun words resolve to Semantic Concept/Entity for proper items.

In another preferred embodiment, there is provided a system for providing a Note Graphical User Interface (NGUI) application for handling electronic notes in a mobile device, comprising: a memory storing one or more programs configured to be executed by one or more processors, the one or more programs including instructions for saving mobile electronic display note rendering data on a frame by frame basis; providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures.

A method of projecting an animated gesture of an intelligent interactive agent in a Note Graphical User Interface, comprising the step of operating the GUI from verbal commands, wherein the Intelligent Interactive Agent is a graphic animation to a user, wherein said Intelligent Interactive Agent has modules for receiving and processing verbal commands from the user, wherein the Intelligent Interactive Agent operates the GUI from the verbal commands, wherein the intelligent interactive agent executes GUI operations comprising tapping, swiping, pinching of a one or more mobile electronic display notes displayed in a container display matrix, wherein the graphic animation is rendered to project a tapping gesture as part of the tapping operation, wherein the graphic animation is rendered to project a swiping gesture as part of the swiping operation, and wherein the graphic animation is rendered to project a pinching gesture as part of the pinching operation.

In another preferred embodiment, there is provided a system for providing a Note Graphical User Interface (NGUI) application for handling electronic notes in a mobile device, comprising: a memory storing one or more programs configured to be executed by one or more processors, the one or more programs including instructions for saving mobile electronic display note rendering on a frame by frame basis; providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and providing a technical architecture having the following components; 1. An Automated Overlap Detector which automatically computes overlaps between mobile electronic display notes; 2. A Virtual Event Planner which creates an Event Plan of steps that include one or more virtual events and creates user interaction parameters comprising position, distance, time, trajectory, wherein the entire plan is handed over to a Virtual Event Performer; 3. The Virtual Event Performer which co-ordinates the virtual events in the Event Plan generated by the Virtual Event Planner and executes the virtual events by pushing them into a Virtual Event Queue which will perform one or more of the following steps: a. execute the 2nd virtual event immediately after pushing the 1st virtual event into the virtual event queue; orb. Wait for completion of execution of virtual event 1 and retrieve a notification of completion by the interpreter before moving on to virtual event 2; or c. Wait for a configured delay between performing virtual event 1 and virtual event 2; 4. A Virtual Event Interpreter which receives Virtual Events from the Virtual Event Queue and executes them on the GUI, and controls animation of a Personal Virtual Assistant to perform gestures corresponding to the Virtual Events, and notifies a Virtual Event Performer of completion of the Virtual Event; and 5. A Virtual Assistant Animation Engine which reads information contained in the Virtual Event and performs a series of animations to complement the Virtual Event, wherein in a Tap Virtual Event the Virtual Assistant Animation Engine performs the following steps: reads a Rectangular region for the Tap, Calculates a center of gravity of the Rectangular region, Performs a Rotate Body Animation to rotate towards a Note Graphical User Interface (NGUI); Performs a Point Hand Animation to point a hand at the calculated center of gravity; and Performs a Tap Animation which shows Personal Virtual Assistant tapping the hand down like tapping down on a button.

A method of handling electronic notes in a mobile device, comprising: computes overlaps between mobile electronic display notes using An Automated Overlap Detector which automatically; creating an Event Plan of steps that include one or more virtual events and creates user interaction parameters comprising position, distance, time, trajectory using a Virtual Event Planner, wherein the entire plan is handed over to a Virtual Event Performer; co-ordinating the virtual events in the Event Plan generated by the Virtual Event Planner using the Virtual Event Performer, and executing the virtual events by pushing them into a Virtual Event Queue which will perform one or more of the following steps: a. execute the 2nd virtual event immediately after pushing the 1st virtual event into the virtual event queue; orb. Wait for completion of execution of virtual event 1 and retrieve a notification of completion by the interpreter before moving on to virtual event 2; or c. Wait for a configured delay between performing virtual event 1 and virtual event 2; receiving Virtual Events from the Virtual Event Queue using a Virtual Event Interpreter, executing them on the GUI, and controlling animation of a Personal Virtual Assistant to perform gestures corresponding to the Virtual Events, and notifying the Virtual Event Performer of completion of the Virtual Event; and using a Virtual Assistant Animation Engine to read information contained in the Virtual Event and perform a series of animations to complement the Virtual Event, wherein in a Tap Virtual Event the Virtual Assistant Animation Engine performs the following steps: reads a Rectangular region for the Tap, Calculates a center of gravity of the Rectangular region, Performs a Rotate Body Animation to rotate towards a Note Graphical User Interface (NGUI); Performs a Point Hand Animation to point a hand at the calculated center of gravity; and Performs a Tap Animation which shows Personal Virtual Assistant tapping the hand down like tapping down on a button.

In another preferred embodiment, there is provided a system for providing a Note Graphical User Interface (NGUI) application for handling electronic notes in a mobile device, comprising: a memory storing one or more programs configured to be executed by one or more processors, the one or more programs including instructions for saving mobile electronic display note rendering on a frame by frame basis; providing an Intelligent Interactive Agent as a graphic animation to a user, said Intelligent Interactive Agent having modules for receiving and processing verbal commands from the user; wherein the Intelligent Interactive Agent operates the GUI from the verbal commands; wherein the intelligent interactive agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the human-like animation comprises matched human-like characteristics, said characteristics comprising a human-like facial proportions, a human-like appearance, a human-like voice, and human-like gestures; and providing Natural Language Search; wherein a user can ask an intelligent agent questions about data contained within a mobile electronic display note; wherein the intelligent agent performs a search and replies with mobile electronic display notes that satisfy pre-set search parameters.

A method of providing a Note Graphical User Interface (NGUI) application for handling electronic notes in a mobile device, comprising the following steps: querying the intelligent interactive agent configured to provide Natural Language Search about data contained within mobile electronic display notes; and performing a search and replying with a selection of mobile electronic display notes that satisfy pre-set search parameters related to the query.

BRIEF DESCRIPTION OF THE DRAWINGS

FIG. 37 is an illustrative representation of a Note Graphical User Interface (NGUI) container of mobile electronic display notes showing intelligent agent having navigated to the section of the Note Graphical User Interface (NGUI) containing the mobile electronic display note that the user searched for.

DETAILED DESCRIPTION OF THE INVENTION

Definitions

Figure 1:
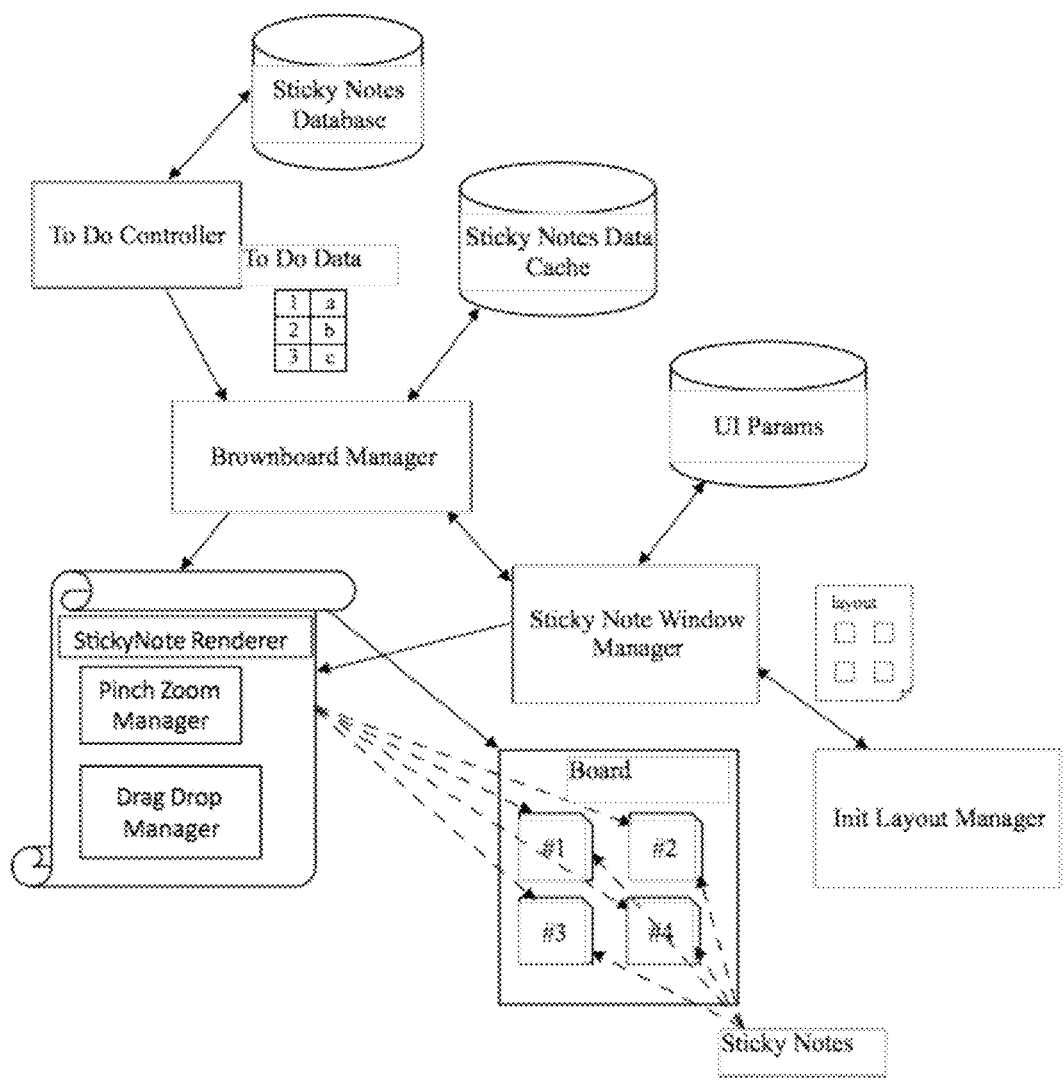
FIG. 1 is a functional block diagram of an architectural overview of one embodiment of the invention.

Structural Elements of a Graphical User Interface

User interfaces use visual conventions to represent the generic information shown. Some conventions are used to build the structure of the static elements on which the user can interact, and define the appearance of the interface.

Window

A window is an area on the screen that displays information, with its contents being displayed independently from the rest of the screen. It is easy for a user to manipulate a window: it can be shown and hidden by clicking on an icon or application, and it can be moved to any area by dragging it (that is, by clicking in a certain area of the window—usually the title bar along the tops—and keeping the pointing device's button pressed, then moving the pointing device). A window can be placed in front or behind another window, its size can be adjusted, and scrollbars can be used to navigate the sections within it. Multiple windows can also be open at one time, in which case each window can display a different application or file—this is very useful when working in a multitasking environment. The system memory is the only limitation to the number of windows that can be open at once. There are also many types of specialized windows.

A container window a window that is opened while invoking the icon of a mass storage device, or directory or folder and which is presenting an ordered list of other icons that could be again some other directories, or data files or maybe even executable programs. All modern container windows could present their content on screen either acting as browser windows or text windows. Their behavior can automatically change according to the choices of the single users and their preferred approach to the graphical user interface.

A child window opens automatically or as a result of a user activity in a parent window.

A message window, or dialog box, is a type of child window. These are usually small and basic windows that are opened by a program to display information to the user and/or get information from the user. They usually have a button that must be pushed before the program can be resumed.

Icons

An icon is a small picture that represents objects such as a file, program, web page, or command. They are a quick way to execute commands, open documents, and run programs. Icons are also very useful when searching for an object in a browser list, because in many operating systems all documents using the same extension will have the same icon.

Controls (or widgets) Graphical control element

Interface elements known as graphical control elements, controls or widgets are software components that a computer user interacts with through direct manipulation to read or edit information about an application. Each widget facilitates a specific user-computer interaction. Structuring a user interface with Widget toolkits allow developers to reuse code for similar tasks, and provides users with a common language for interaction, maintaining consistency throughout the whole information system.

Common uses for widgets involve the display of collections of related items (such as with various list and canvas controls), initiation of actions and processes within the interface (buttons and menus), navigation within the space of the information system (links, tabs and scrollbars), and representing and manipulating data values (labels, check boxes, radio buttons, sliders, spinners . . . )

Interaction Elements

Some common idioms for interaction have evolved in the visual language used in GUIs. Interaction elements are interface objects that represent the state of an ongoing operation or transformation, either as visual remainders of the user intent (such as the pointer), or as affordances showing places where the user may interact.

Cursor

A cursor is an indicator used to show the position on a computer monitor or other display device that will respond to input from a text input or pointing device.

Pointer

The pointer echoes movements of the pointing device, commonly a mouse or touchpad. The pointer is the place where actions take place that are initiated through direct manipulation gestures such as click, touch and drag.

Insertion Point

The caret, text cursor or insertion point represents the point of the user interface where the focus is located. It represents the object that will be used as the default subject of user-initiated commands such as writing text, starting a selection or a copy-paste operation through the keyboard.

Selection

A selection is a list of items on which user operations will take place. The user typically adds items to the list manually, although the computer may create a selection automatically.

Adjustment Handle

A handle is an indicator of a starting point for a drag and drop operation. Usually the pointer shape changes when placed on the handle, showing an icon that represents the supported drag operation.

Mobile Devices

Embodiments of the present invention make use of a mobile communication device. As contemplated herein a mobile device is a two-way communication device with advanced data communication capabilities having the capability to communicate in a wireless or wired fashion with other computing devices. As adequately described in U.S. Pat. No. 7,912,480, mobile devices include the capability for voice communications and data messaging, as well as capabilities as wireless Internet appliances. Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Communications Networks

Data and voice communications are performed through a communication subsystem that receives messages from and sends messages to a wireless network. The communication subsystem can be configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), Intelligent Digital Enhanced Network (iDEN™), 4G, LTE, LTE Advanced, and 5G standards.

Mobile device hardware and subsystems

The main processor interacts with subsystems such as Random Access Memory (RAM), flash memory, display, auxiliary input/output (I/O) subsystem, data port, keyboard, speaker, microphone, short-range communications.

Some of the subsystems perform communication-related functions, whereas other subsystems provide "resident" or on-device functions. By way of example, the display and the keyboard can be used for both communication-related functions, such as entering a text message for transmission over the network, and device-resident functions such as a calculator or task list.

Operating system software used by the main processor is typically stored in a persistent store such as the flash memory, which can alternatively be a read-only memory (ROM) or similar storage element. Those skilled in the art will appreciate that the operating system, specific device applications, or parts thereof, can be temporarily loaded into a volatile store such as the RAM.

Mobile devices send and receive communication signals over wireless networks after network registration or activation procedures are completed.

The main processor, in addition to its operating system functions, enables execution of software applications on the mobile device. The subset of software applications that control basic device operations, including data and voice communication applications, will normally be installed on the mobile device during its manufacture. The programs can include an email program, a web browser, an attachment viewer, and the like.

Mobile devices also include a device state module, an address book, a Personal Information Manager (PIM), and other modules. The device state module can provide persistence, i.e. the device state module ensures that important device data is stored in persistent memory, such as the flash memory, so that the data is not lost when the mobile device is turned off or loses power. The address book can provide information for a list of contacts for the user. For a given contact in the address book, the information can include the name, phone number, work address and email address of the contact, among other information. The PIM has functionality for organizing and managing data items of interest to a subscriber, such as, but not limited to, e-mail, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device with respect to such items. This can be particularly advantageous when the host computer system is the mobile device subscriber's office computer system.

Additional applications can also be loaded onto the mobile device through at least one of the wireless network, the auxiliary I/O subsystem, the data port, or the short-range communications subsystem. This flexibility in application installation increases the functionality of the mobile device and can provide enhanced on-device functions, communication-related functions, or both. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices.

Generally, a received signal such as a text message, an e-mail message, or web page download will be processed by the communication subsystem and input to the main processor. The main processor will then process the received signal for output to the display or alternatively to the auxiliary I/O subsystem. A subscriber can also compose data items, such as e-mail messages, for example, using the keyboard in conjunction with the display and possibly the auxiliary I/O subsystem. The auxiliary subsystem can include devices such as: a touch screen, mouse, track ball, infrared fingerprint detector, or a roller wheel with dynamic button pressing capability. A composed message can be transmitted over the wireless network through the communication subsystem.

For voice communications, the overall operation of the mobile device is substantially similar, except that the received signals are output to the speaker, and signals for transmission are generated by the microphone. Alternative voice or audio I/O subsystems, such as a voice message recording subsystem, can also be implemented on the mobile device. Although voice or audio signal output is accomplished primarily through the speaker, the display can also be used to provide additional information such as the identity of a calling party, duration of a voice call, or other voice call related information.

Communication subsystems comprise a receiver and a transmitter, one or more embedded or internal antennas, Local Oscillators, and a communications processor for wireless communication. The communications processor can be a Digital Signal Processor (DSP).

Non-transitory computer-readable storage media includes any physical form capable of storing and providing access to computer instructions that, when executed by a computer processor, cause the processor to perform the functions described in the steps provided herein. Media may include without limitation a hard drive, solid state drive, flash memory, and ROM memory.

Processor comprises electronic processing circuitry or control circuitry that operates to control the operations and performance of the electronic device and the application thereon.

Input interfaces comprise inputs to electronic circuitry comprising one or more tactile inputs, microphone inputs, camera input. Outputs comprise one or more display outputs, speaker outputs, and tactile/haptic outputs. Inputs and outputs may connect by wire or wirelessly and include appropriate hardware, firmware and software for successful connection. An example of mobile electronic devices contemplated for use in the present invention include without limitation by way of example an Apple iPhone 3-4-5-6, Apple iPads, Apple Minis, Samsung Galaxy series smartphones and tablets, as well as similar Windows operated devices, and other Android operated devices.

Signals and Networks

Signals received by the antenna through the wireless network are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor. In a similar manner, signals to be transmitted are processed, including modulation and encoding, by the communications processor. These processed signals are input to the transmitter for digital-to-analog (D/A) conversion, frequency up conversion, filtering, amplification and transmission over the wireless network via the antenna.

The wireless link between the mobile device and the wireless network can contain one or more different channels, typically different RF channels, and associated protocols used between the mobile device and the wireless network. An RF channel is a limited resource that must be conserved, typically due to limits in overall bandwidth and limited battery power of the mobile device.

Messages intended for a user of mobile device are initially received by a message server of LAN. Such messages may originate from any of a number of sources, including from a computer within LAN, from a different mobile device connected to wireless network, directly from a different computing device.

Message servers typically act as the primary interface for the exchange of messages, particularly e-mail messages, within an organization and over the shared network infrastructure. Each user in the organization that has been set up to send and receive messages is typically associated with a user account managed by a message server.

Message servers may: monitor the user's "mailbox" for new e-mail messages; apply user-definable filters to new messages to determine if and how the messages will be relayed to the user's mobile device; push messages to a mobile device, receive messages composed on mobile device, re-format the composed messages, and re-route the composed messages for delivery.

Mobile Electronic Display Notes Server

The wireless support components may also include a mobile note server that, in a similar manner to that of the message management server, facilitates the handling of electronic notes. For example, mobile note server may: provide a storage area for a user's electronic notes; monitor for new or edited notes; communicate with other devices when a note is edited; communicate with other servers; and the like.

Embodiments include a system for electronic notes in a mobile environment. This system includes a mobile note controller, which controls the operation of the system and co-ordinates the various functional blocks within the system. The mobile note controller is connected to, and interacts with, a notes database, an input module, an output module, a display/notification module, a location module, and a time module.

The system allows a user to enter electronic notes into the notes database via the input module and the mobile note controller. When entering a new electronic note or editing an electronic note, the user (the person inputting the electronic note) is given the option of entering information, for example, in various fields, including, for example, a location and a time. This information allows the person inputting the electronic note to better define when the electronic note should be made active and/or when a user is to be notified.

NLP: Natural Language Processing

Natural language processing (NLP) refers to the computer understanding, analysis, manipulation, and/or generation of natural language. NLP is a subfield of artificial intelligence and linguistics. It studies the problems of automated generation and understanding of natural human languages. Natural language generation systems convert information from computer databases into normal-sounding human language, and natural language understanding systems convert samples of human language into more formal representations that are easier for computer programs to manipulate.

Processing natural language for numerous applications is generally well known. Recent interest in processing has been due in large part by computer applications such as language translation, grammatical correction of sentences as part of word processing systems, and the like. For example, Machine Translation Technology: On the Way to Market Introduction, Siemens Review, Vol. 54, No. 6 November/December (1987) describe research into machine translation of text in several languages. Also, the use of language parsing in processing natural language is well known. Many parsing techniques have been described, see for example, J. J. Robinson, Diagrams: A Grammar for Dialogues, Communication of the Association for Computing Machinery, Vol. 25, No. 1, January 1982, pp. 27-47, which discloses an interactive filter procedure, a grammar core, a weakening factor, a probability factor and a threshold mechanism; and K. Vehara, et al., Steps Toward an Actor-Oriented Integrated Parser, Proceeding of the International Conference of Fifth Generation of Computer Systems 1984, Tokyo, Japan, Nov. 6-9, 1984 (ICOT, North Holland).

Methods of grammatically processing a sentence using parsers are described in: Allen, James; Natural Language Understanding. (The Benjamin/Cummings Publishing Company Inc., Menlo Park, U.S.A. 1987.)

The parsers there described operate according to an algorithm based on a rewriting mechanism. This mechanism requires that the parsers carry out parsing by reference to a large number of rewriting rules. These rewriting rules make a connection between a group of words and/or sentence constituents, on the one hand, and a parent constituent, i.e. a constituent dominating this group, on the other hand.

The number of rewriting rules depends on the extent of the description mechanism to be used and forming the basis of the parser.

As defined herein, feedback that comprises a graphical or spoken output from the portable electronic device is performed by an intelligent agent displayed by means of an Animated 3D Personal Virtual Assistant with Facial Expressions, hand gestures and body movements in a Human like appearance. This is not an abstract intelligent agent functionality but it is personified by means of an intelligent agent displayed by means of an Animated 3D Personal Virtual Assistant with Facial Expressions, hand gestures and body movements in a Human like appearance and includes these features:

1. programmed to process/understand language using NLP/NLU (Natural language processing/understanding) Features 2. programmed to represent knowledge in a Cognitive Model using Semantic Actions and Entities/Concepts and their inter-relationships and
3. programmed to express its knowledge by generating English responses using NLG (Natural Language Generation) features
4. programmed to maintain behavioral states and feelings in a computational manner as a result of circumstantial triggers, user's behavior and Agent's own productivity by means of a Psychology Engine and express the same using facial Expressions rendered in a 3D Avatar
5. programmed to have Conversations/Dialogs in a taking-turns, i.e. dialogue, manner while remembering the context of the conversation in a Contextual Memory, as compared to just answering a question asked by the user and then forgetting it.

Referring now to the Figures, FIG. 1 is a functional block diagram of an architectural overview of one embodiment of the invention. FIG. 1 shows how the ToDoController initializes the NGUI-Manager and gives it a set of DisplayNote objects that it gets from the SQLite Database.

Each of these DisplayNote objects contain the data of the DisplayNote.

If the layout had been initialized before the WindowManager gets UIParam objects (UIParam objects==>User Interface parameters including position of the mobile electronic display notes i.e. X,Y coordinates. Dimensions including height and width of the mobile electronic display notes and Depth i.e. Z-index of the mobile electronic display notes) from a separate database which only stores UIParam. These UI Params contain position i.e. (x,y) information in pixels of the DisplayNote assuming the top left as (0,0) as a reference point, Z-Index depth information (e.g. assuming there are N no of mobile electronic display notes, the rearmost mobile electronic display note has a Z-index 1 and the frontmost mobile electronic display note has a Z-index of N) and dimensions for the mobile electronic display notes to be displayed within the container.

If the layout is being initialized for the first time, the WindowManager passes the preferred dimensions of the container (NGUI-View) and a expected standard dimension for the DisplayNoteViews to the InitLayoutManager Module (which is responsible for calculating the initial layout of Note Graphical User Interface manager given the dimension of the Note Graphical User Interface display area, the no. of the mobile electronic display notes to be displayed and the expected initial dimension i.e. height and width of the mobile electronic display notes). The initial dimensions in pixels are preset but can also be altered by the user via the Preferences setting. For example for a container size of 100 px height and 100 px width, the dimensions is 20 px width and 20 px height.

The InitLayoutManager will calculate the layout for example 3 rows and 2 columns or 3 rows and 3 columns etc., the x and y coordinates along with Z-index (i.e. depth) of each mobile electronic display note based on the container's dimension and the preferred DisplayNote dimensions given to it and populates and returns the layout information of these DisplayNote objects. The InitLayoutManager adjusts the width and height to achieve the best fit layout. For example, if the layout allows 3 columns of 100 px width each and the preferred width is 95 px it will use 100 px instead, thus stretching each DisplayNote by 5 px in width.

The WindowManager uses the layout information to generate the UIParam objects and gives them to the Renderer.

The WindowManager stores the dimensions corresponding to each UIParam object.

The Renderer uses the UIParam objects from the WindowManager in combination with the data that it gets from the NGUI-Manager corresponding to each DisplayNoteView and prepares the User Interface to be rendered as a result.

The WindowManager has a specialized optimization logic that checks if any of the DisplayNoteViews need to be re-rendered and marks those views as dirty which means it needs re-rendering. This is needed when the page has been updated as a result of a user initiated event but not yet rendered. At initialization it marks all of the views as dirty so that the Renderer can render all of them.

Figure 2:
FIG. 2 is an illustrative representation of mobile electronic display notes on a Note Graphical User Interface (NGUI) in a spread non-overlapping arrangement.

Referring now to FIG. 2 which shows an illustrative representation of mobile electronic display notes on a Note Graphical User Interface (NGUI) in a spread non-overlapping arrangement. FIG. 2 shows how the user can interact via different events like tapping, pinching and dragging the DisplayNote. The tapping gesture causes the DisplayNote to come in focus/front.

Figure 3:
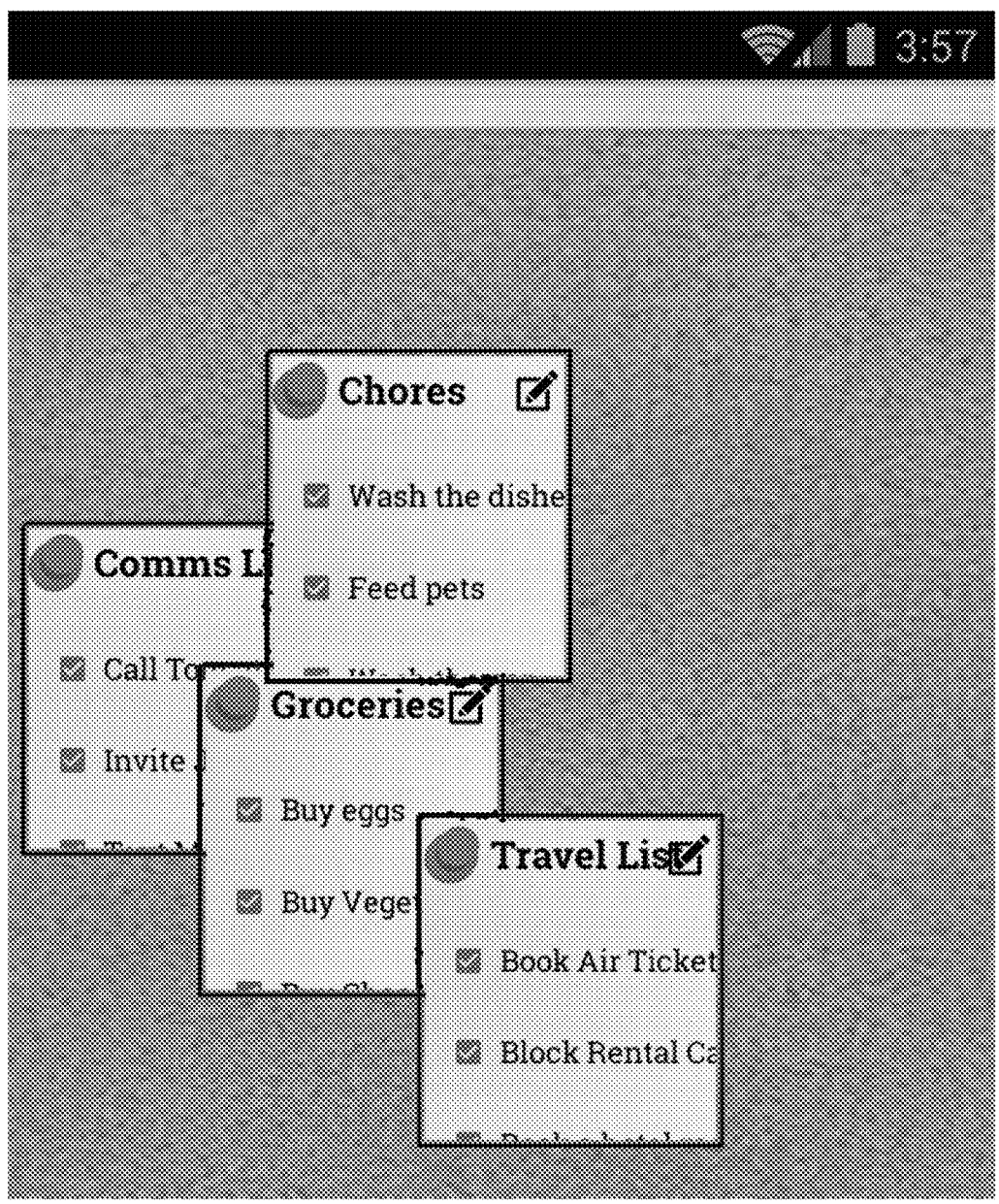
FIG. 3 is an illustrative representation of mobile electronic display notes on a Note Graphical User Interface (NGUI) in an overlapping arrangement.

Referring now to FIG. 3 which shows an illustrative representation of mobile electronic display notes on a Note Graphical User Interface (NGUI) in an overlapping arrangement. FIG. 3 shows the Pinch-In gesture causes the DisplayNote to shrink in size whereas the Pinch-Out gesture causes the DisplayNote to grow in size.

Figure 4:
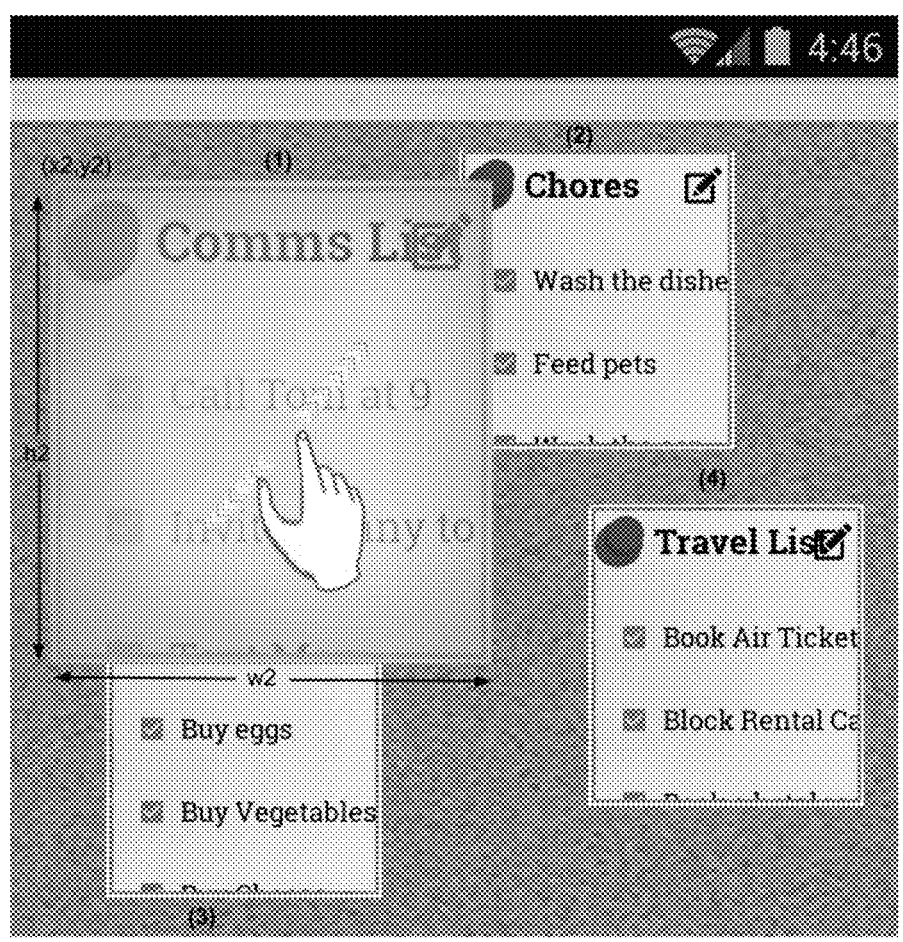
FIG. 4 is an illustrative representation of mobile electronic display notes on a Note Graphical User Interface (NGUI) showing resizing of a note using a pinch feature.

Referring now to FIG. 4 which shows an illustrative representation of mobile electronic display notes on a Note Graphical User Interface (NGUI) showing resizing of a note using a pinch feature. FIG. 4 shows the drag event allows the user to move the notes around in the container.

Figure 5:
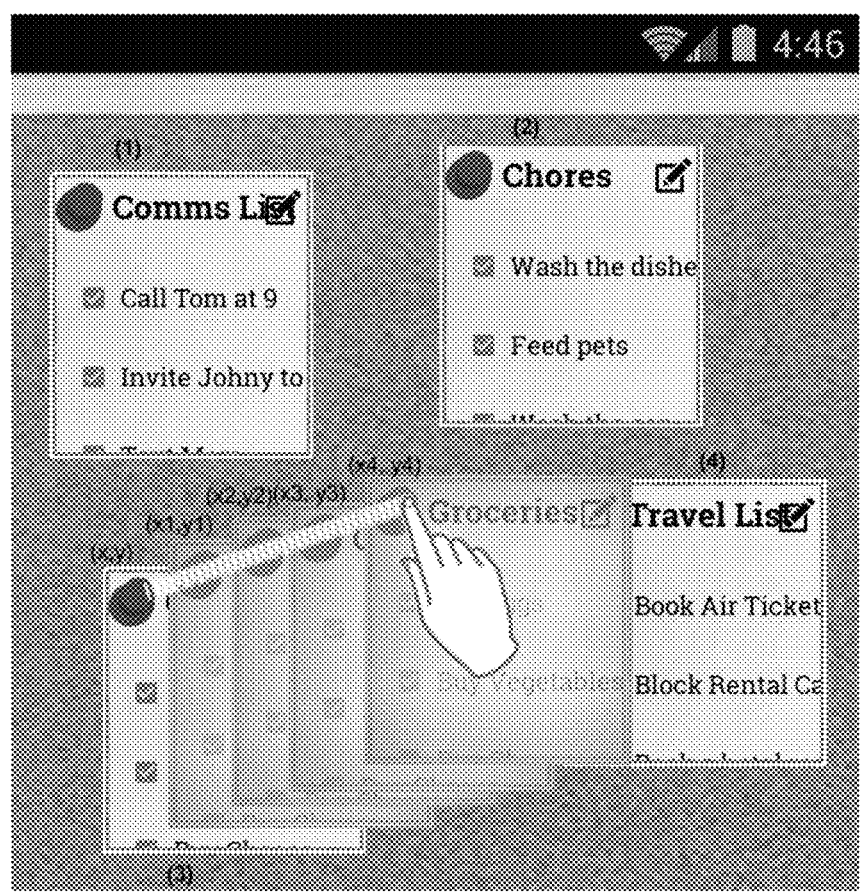
FIG. 5 is an illustrative representation of mobile electronic display notes on a Note Graphical User Interface (NGUI) showing movement of a note using a drag and drop feature.

Referring now to FIG. 5 which shows an illustrative representation of mobile electronic display notes on a Note Graphical User Interface (NGUI) showing movement of a note using a drag and drop feature. FIG. 5 shows that the Z-Index Manager, the Pinch&Zoom Manager and the Drag & Drop Manager are specialized modules which are part of the Renderer and are responsible for handling their respective gestures for the DisplayNoteViews and rendering the animation scene by scene. These are optimized to only render the views affected by these gestures rather than all the views.

Types of Events and How they're handled:

Tap to Focus:

Invoked whenever the user taps on any DisplayNoteView in order to bring that selected DisplayNote into focus/front.

The DisplayNoteView notifies the NGUI-Manager which then notifies the WindowManager.

The WindowManager finds out which DisplayNotes overlap asks the Z-IndexManager to calculate the new Z-Indices of the overlapping views.

The WindowManager then marks them with a dirty flag and then notifies the Renderer which renders the views affected by the Z-Index change.

Drag & Drop:

Invoked whenever the user begins a Drag gesture on any DisplayNoteView to reposition it.

The DisplayNoteView notifies the Drag&Drop Manager.

The Drag&Drop Manager calculates all intermediate dimensions/positions of the DisplayNoteView for all the intermediate animation scenes generated while dragging and notifies the WindowManager.

The WindowManager then intelligently identifies which notes need to be re-rendered and marks them with a dirty flag and then notifies the Renderer which renders the views that are marked dirty.

When the user drops the DisplayNoteView, the DisplayNoteView notifies the WindowManager which now understands that the dragging gesture is complete and updates the stored UIParams with the final positions and z indices of the affected DisplayNoteViews.

Pinch & Zoom:

Invoked whenever the user begins a Pinch gesture on any DisplayNoteView to either shrink it (Pinch-in) or expand it (Pinch-out).

The DisplayNoteView notifies the Pinch&ZoomManager.

The Pinch&Zoom Manager calculates all intermediate dimensions of the DisplayNoteView while pinching and notifies the WindowManager.

The WindowManager then intelligently identifies which notes need to be re-rendered and marks them with a dirty flag and then notifies the Renderer which renders the views affected.

When the user releases the DisplayNoteView, the DisplayNoteView notifies the WindowManager which now understands that the pinch gesture is complete and notifies the NGUI-Manager to update the stored UIParams with the final positions, z indices and dimensions of the affected DisplayNoteViews.

WindowManager & the Renderer

The WindowManager stores the dimensions and positions of the DisplayNoteViews.

It also contains the logic to check if two views overlap each other. This was demonstrated in the Pinch&Zoom and Drag&Drop sections.

View Hierarchy

Figure 6:
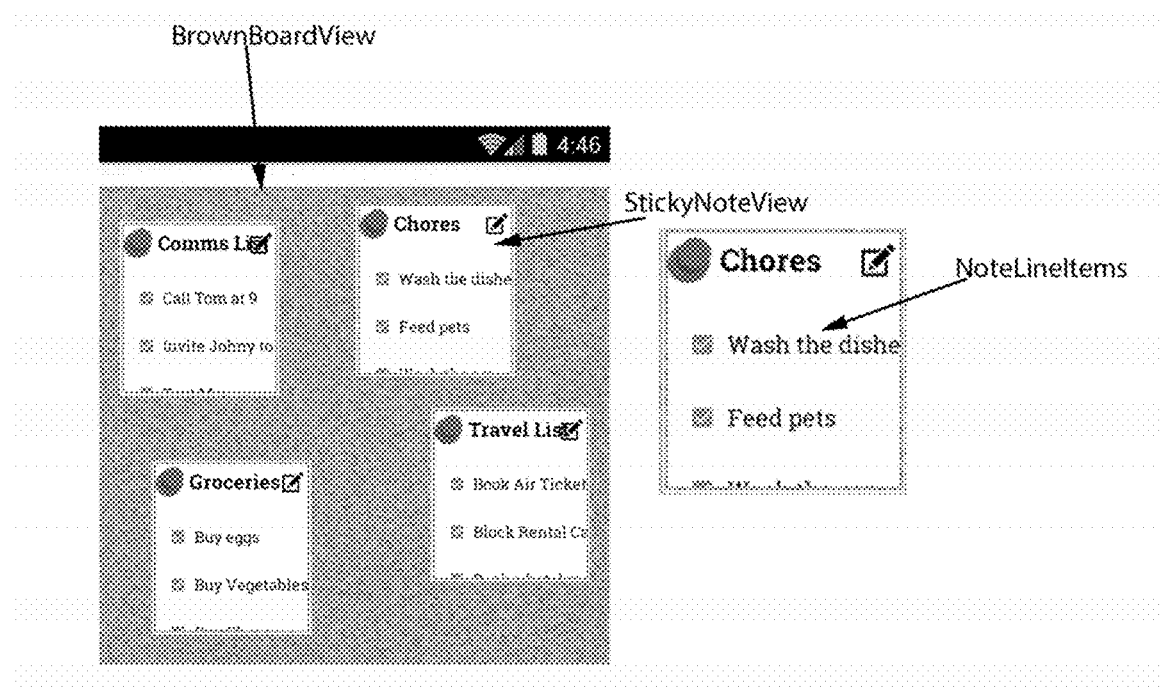
FIG. 6 is an illustrative representation of mobile electronic display notes on a Note Graphical User Interface (NGUI) showing a detail of a note having line items.

Referring now to FIG. 6 which shows an illustrative representation of mobile electronic display notes on a Note Graphical User Interface (NGUI) showing a detail of a note having line items.

Note: View Component ===== means >>>>>> User interface Component (e.g. a text field, text area, a button, a checkbox are all User interface Components. Some might be embedded inside others which become the container for the embedded ones)

The NGUI-View is a custom view component that plays the role of the container for the DisplayNoteViews. The DisplayNoteViews are custom view component but are embedded inside the NGUI-View which acts as a Container (thereby establishing a parent child relationship).

Each DisplayNoteView contains one or more Note(s) or List(s) which are themselves a custom view component contained within the DisplayNoteView as its parent.

The NGUI-Manager manages the NGUI-View and the DisplayNotes

InitLayoutManager

Figure 7:
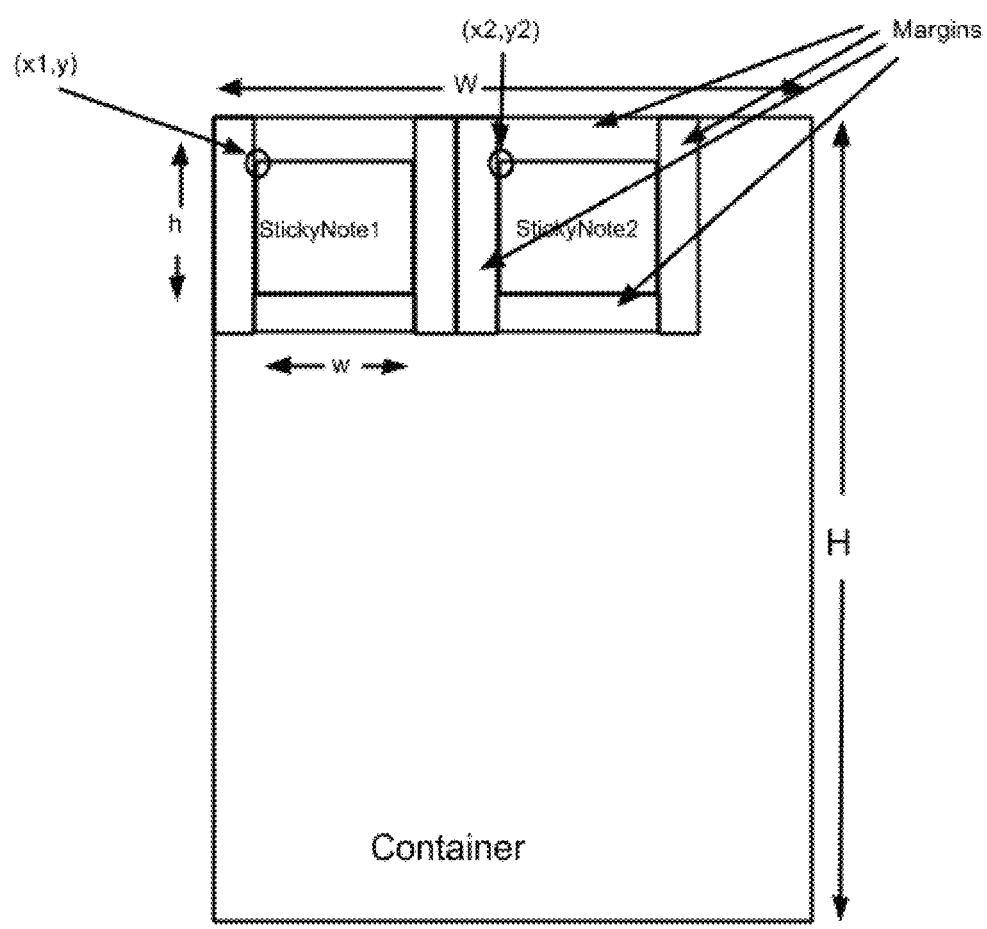
FIG. 7 is a line drawing representation of mobile electronic display notes on a Note Graphical User Interface (NGUI) container showing height, width, x,y coordinates, and use of margins.

Referring now to FIG. 7 which shows a line drawing representation of mobile electronic display notes on a Note Graphical User Interface (NGUI) container showing height, width, x,y coordinates, and use of margins.

As can be seen in the diagram above:

H—is the height of the container of the DisplayNotes i.e. Note GUI

W—is the width of the container of the DisplayNotes i.e. Note GUI w—is the preset width of a DisplayNote h—is the preset height of a DisplayNote M—is the calculated no. of columns N—is the calculated no. of rows x1, y1, x2, y2—are the locations of the DisplayNotes 1 and 2 respectively within the Note GUI z—is the depth index which allows views to be overlapped one on top of the other e.g. z-index of 1 means it's behind everyone else and hence obscured by everyone in front of it.

The InitLayoutManager calculates the no. of rows and columns (M×N), the x,y position of the DisplayNote within the container and the z-index of the DisplayNote as follows:

$$M=W/wT$$

$$N=H/hT$$

Assuming w is the width and h is the height the effective position i.e. $X_{ij}$, $Y_{ij}$ of a DisplayNote in the ith row and the jth column can be computed using the formula $$X_{ij}=[(w+Lm+Rm)\times(j-1)]+Lm$$

$$Y_{ij}=[(h+Tm+Bm)\times(i-1)]+Tm$$

Where w is the expected width of the note,

Lm=left margin expected/assumed

Rm=right margin expected/assumed

Tm=Top margin expected/assumed

Bm=bottom margin expected/assumed

Hence (w+Lm+Rm) is the total width and (h+Tm+Bm) is the total height of the area occupied by 1 note.

Because we are calculating the jth mobile electronic display note from left, we need to consider all the (j−1) mobile electronic display notes that are on the left of the current one being computed.

Hence we multiply the width of one note (w+Lm+Rm) by (j−1) to arrive at a

Total previous Width=[(w+Lm+Rm)×(j−1)] which indicates total previous width occupied by all the mobile electronic display notes to the left of the current one.

Now we add the left margin Lm for the current mobile electronic display note on column j to arrive at the effective X coordinate of the mobile electronic display note on row i and column j i.e. $X_{ij}=[(w+Lm+Rm)\times(j-1)]+Lm$ Similarly, because we are calculating the ith mobile electronic display note from top, we need to consider all the (i−1) mobile electronic display notes that are above the current one being computed.

Hence we multiply the height of one note (h+Tm+Bm) by (i−1) to arrive at a

Total previous Height=[(h+Tm+Bm)×(i−1)] which indicates total previous height occupied by all the mobile electronic display notes above the current one.

Then we add the top margin Tm for the current mobile electronic display note on row i to arrive at the effective Y coordinate of the mobile electronic display note on row i and column j i.e. $Y_{ij}=[(h+Tm+Bm)\times(i-1)]+Tm$ Notes:

Each DisplayNote has a preset width, height, leftMargin, topMargin, rightMargin and bottomMargin All the DisplayNotes are placed at the same level of Z-Index initially since they don't overlap.

The Z-Index Manager

The Z-Index Manager is the component that's responsible for overlaying views on top of each other.

It maintains an index buffer of the z-index of all the view components in a view at a given time. This is crucial because we can have layers of mobile electronic display notes on the Note Graphical User Interface (NGUI) and each time a new mobile electronic display note is created the Z-Index Manager needs to calculate the z-index of the new view depending on where in the view hierarchy it is being placed.

Assuming that the Z-Index begins at 1 the following diagram shows how the z-index is assigned to each of the views.

Figure 8:
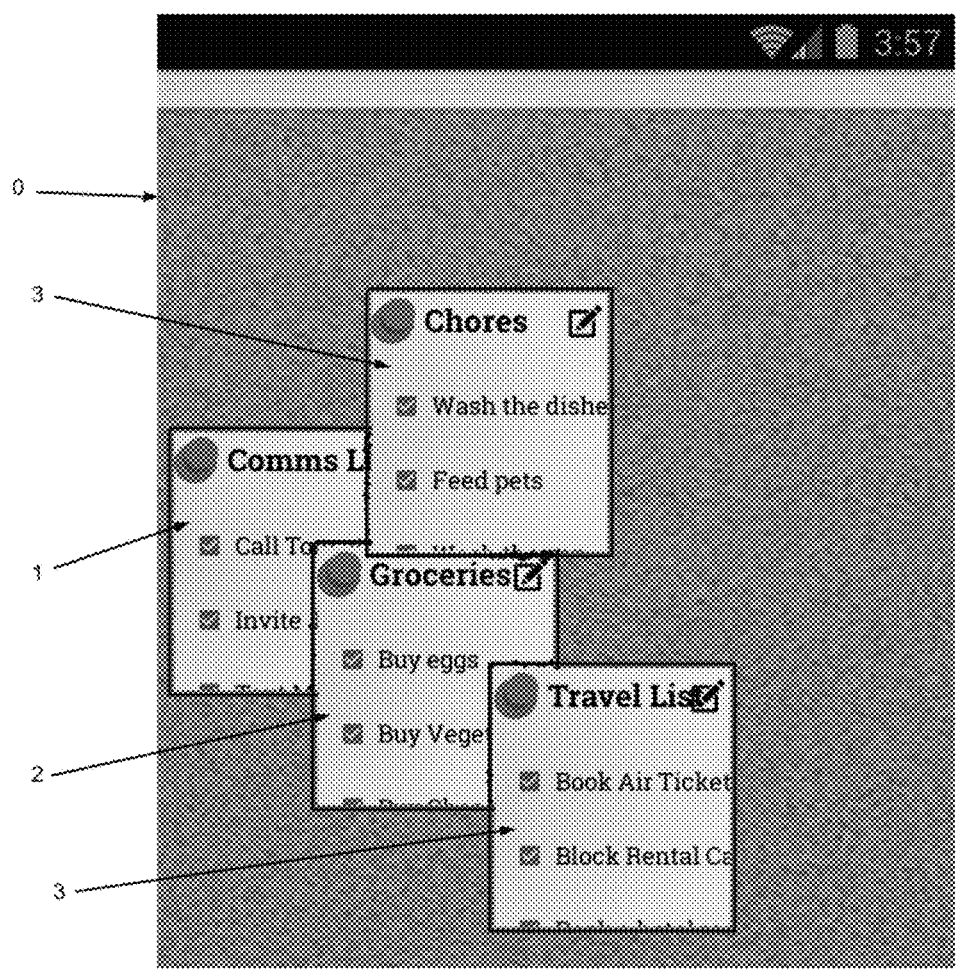
FIG. 8 is an illustrative representation of mobile electronic display notes on a Note Graphical User Interface (NGUI) in an overlapping arrangement.

Referring now to FIG. 8 which shows an illustrative representation of mobile electronic display notes on a Note Graphical User Interface (NGUI) in an overlapping arrangement.

As can be seen from the above diagram the Z-Index Manager assigns the lower-most (visually) view with a Z-Index of 0 and all subsequent overlapping views with a higher Z-Index. For example, the Groceries List mobile electronic display note is assigned a Z-Index of 1 whereas the Travel List Display Note is assigned a Z-Index of 2 but since the Chores mobile electronic display note only overlaps the Comms List and the Groceries mobile electronic display note, it is assigned a Z-Index of 2 and not 3.

The Z-Index manager calculates each Z-Index by checking the bounds of each view and then finding overlapping views. The assigned Z-Index is effectively the Max of the Z-Indices of all the overlapping views+1. Given by the following formula:

Drag&DropManager

The Drag & Drop Manager is responsible for handling the Drag & Drop gesture which is what the user uses to re-position a mobile electronic display note within the container.

When a Drag gesture is initiated, the selected mobile electronic display note is first brought into focus by following the Tap To Focus flow described earlier.

The diagram below describes how the Drag & Drop gesture is handled.

Figure 9:
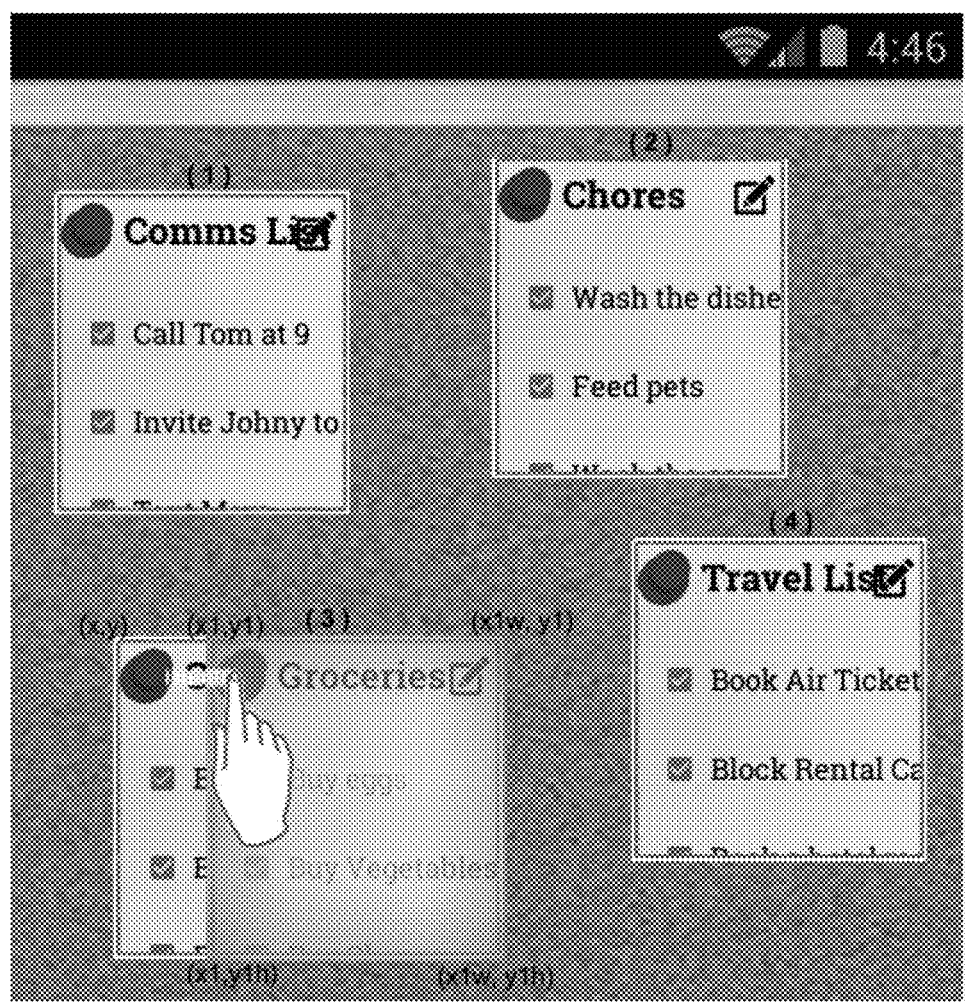
FIG. 9 is an illustrative representation of mobile electronic display notes on a Note Graphical User Interface (NGUI) showing a note being tapped for movement left to right.

Referring now to FIG. 9 which shows an illustrative representation of mobile electronic display notes on a Note Graphical User Interface (NGUI) showing a note being tapped for movement left to right.

Here we can see the DisplayNoteView (3) being displaced from it's original position x,y to a new position x1,y1

At every step of a Drag, the WindowManager calculates the new view's position based on the following formula:

Where dX and dY is the distance dragged in the X and Y dimensions respectively.

The WindowManager calculates the Area Revealed and the Area Concealed then checks if any DisplayNoteView intersects these regions.

Since no other DisplayNoteView overlaps this region it only marks this DisplayNoteView (3) as dirty.

The renderer then checks for and re-renders any DisplayNoteViews which are marked as dirty. In this case it only re-renderes the current DisplayNoteView (3).

Figure 10:
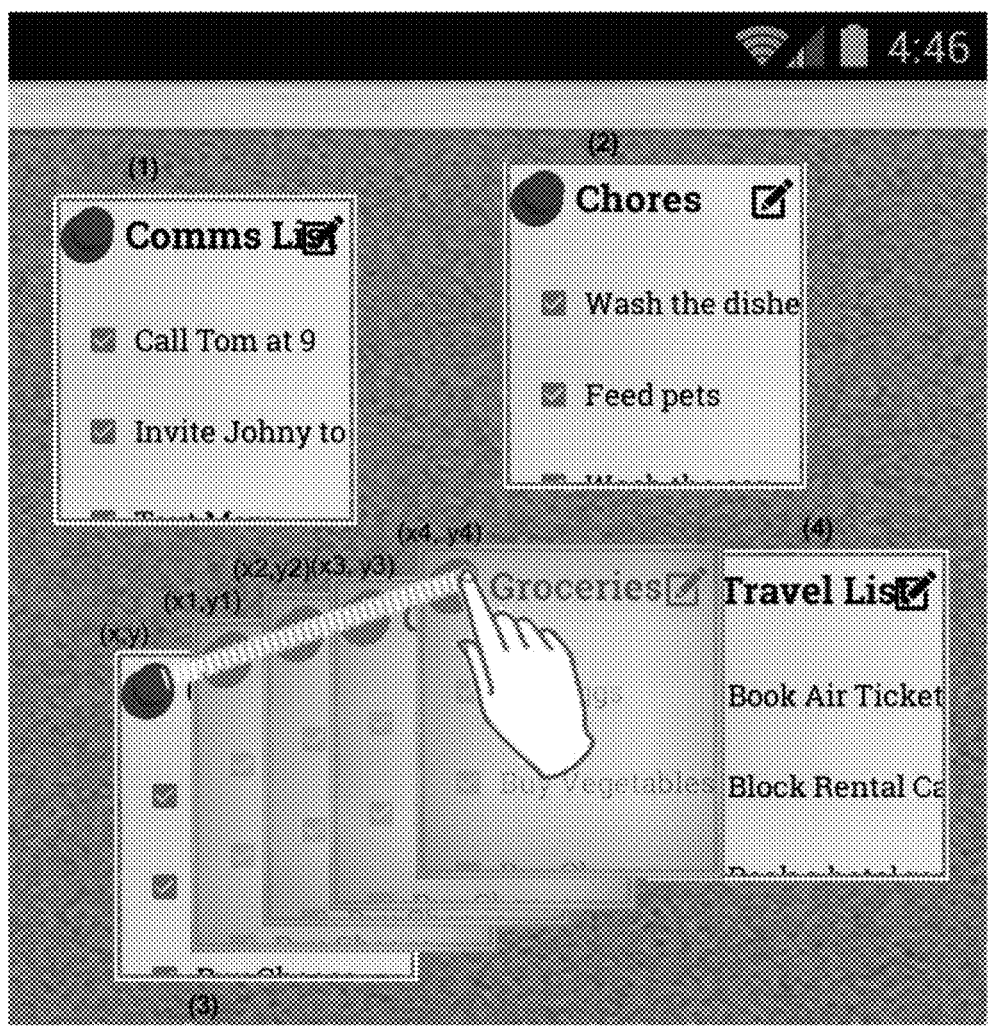
FIG. 10 is an illustrative representation of mobile electronic display notes on a Note Graphical User Interface (NGUI) showing efficient scene by scene animation rendering which only includes the item being moved.

Referring now to FIG. 10 which shows an illustrative representation of mobile electronic display notes on a Note Graphical User Interface (NGUI) showing efficient scene by scene animation rendering which only includes the item being moved.

Here we can see the DisplayNoteView (3) being displaced from x1,y1 to a new position x4,y4 through points x2,y2 and x3,y3

This time when the WindowManager calculates the Area Revealed and the Area Concealed and checks if any DisplayNoteView intersects these regions, it finds that DisplayNoteView 4 intersects and marks it (4) as well as this DisplayNoteView (3) as dirty and notifies the Z-Index Manager to recalculate the Z-Indices of the views making this view have a higher Z-Index.

The renderer then checks for and re-renders any DisplayNoteViews which are marked as dirty. In this case it re-renders the current DisplayNoteView (3) and DisplayNoteView (4).

Figure 11:
FIG. 11 is an illustrative representation of mobile electronic display notes on a Note Graphical User Interface (NGUI) showing an overlapping note with area concealed and area revealed and efficient re-rendering of the dropped item only.

Referring now to FIG. 11 which shows an illustrative representation of mobile electronic display notes on a Note Graphical User Interface (NGUI) showing an overlapping note with area concealed and are revealed and efficient re-rendering of the dropped item only.

Here we can see that the DisplayNoteView (3) is dropped.

The WindowManager calculates the Area Revealed and the Area Concealed and checks if any DisplayNoteViews intersects these regions (other than what was found earlier). In this case it doesn't find any.

The renderer then checks for and re-renders any DisplayNoteViews which are marked as dirty. In this case it doesn't need to re-render any new views. Because the user hasn't dragged further but rather just released the drag/ended the gesture.

Finally when the DisplayNoteView is dropped, the Drag&Drop Manager notifies the NGUI-Manager to update it's UIParams for this DisplayNoteView with the updated position.

Feature #1—Optimal Rendering of Mobile Electronic Display Notes while Performing a Drag & Drop Gesture During the Drag gesture, the mobile electronic display notes might be rendered at max frame rate of 60 frames per second to ensure a smooth animation.

But the no. of frames actually rendered is calculated dynamically.

We set up a checkpoint at every 1/Tth of a second (where T is the no. of time units i.e. milestones within a second. At the end of every milestone $M_i$ (where i ranges from 1 to T), a computation is performed as to how many frames/scenes to render to show the effect of animation WITHIN that milestone)

At every checkpoint i.e. milestone we decide on the no. of frames to render 'NF' WITHIN that milestone depending on the distance moved by the user during that milestone $D_i$ assuming a maximum distance $M_{px}$ that the user can move in the checkpoint (1/Tth of a second):

$$NF = \mathrm{ceil}((D_i/M_{px}) \times (N_{max}/T))$$

We assume T to be 10 initially and $M_{px}$ to be 100, as in we assume that the user can move a maximum distance of 100 px in 1/10th of a second or 100 ms for which we need to render the maximum no. of frames $N_{max}$.

Where $N_{max}$ is the maximum no. of frames that can be rendered in one second (typically, this is 60) and hence ($N_{max}/T$) represents the maximum no. of frames that can be rendered in 1/T seconds.

The ($D_i/M_{px}$) is the ratio of $D_i$ to the maximum distance that the user can move in 1/Tth of a second.

Optimized Rendering Logic

Also at every checkpoint we check if any DisplayNoteViews need to be re-rendered. These are the DisplayNoteViews that were are no longer overlapped by this DisplayNoteView and the DisplayNoteViews that are now overlapped by this DisplayNoteView.

Figure 12:
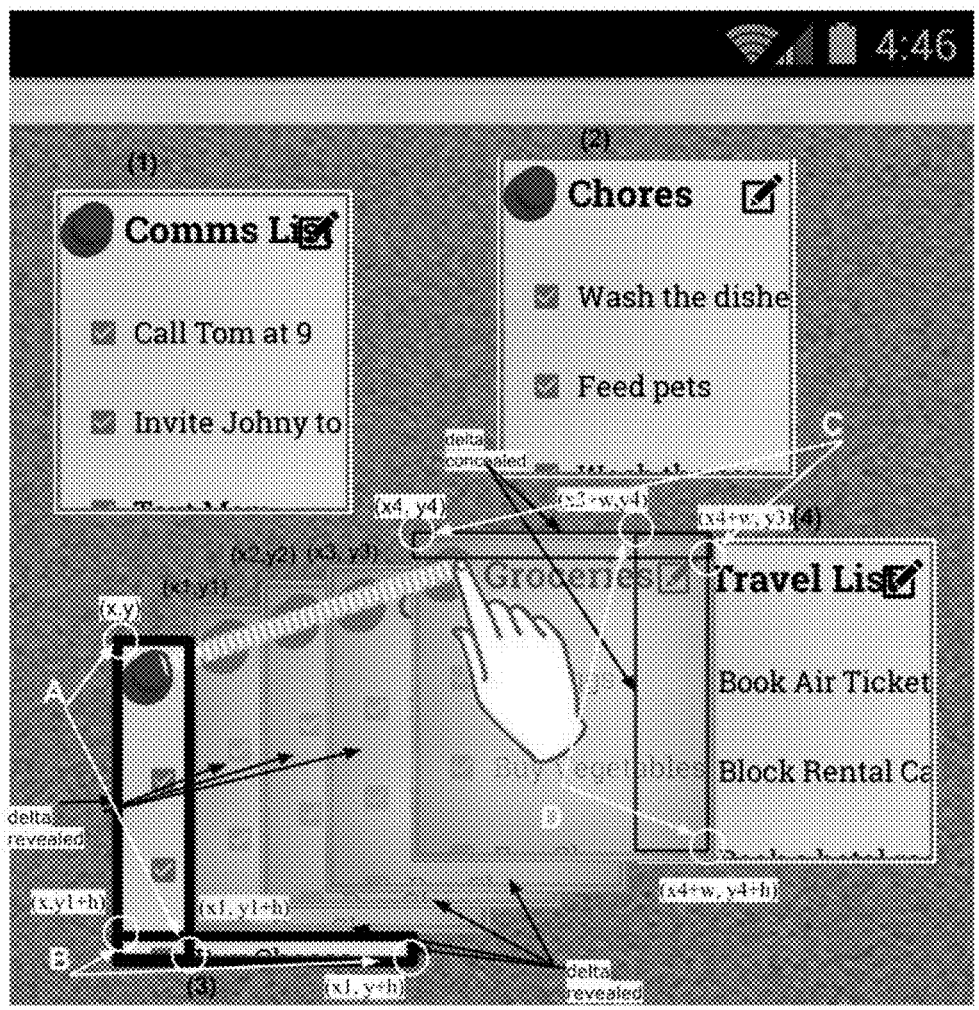
FIG. 12 is an illustrative representation of mobile electronic display notes on a Note Graphical User Interface (NGUI) showing details of frame rendering.

Referring now to FIG. 12 which shows an illustrative representation of mobile electronic display notes on a Note Graphical User Interface (NGUI) showing details of frame rendering.

We can see 4 frames being rendered (and 1 at the original position). At every step we calculate a Delta (?) of the Area Revealed and the Area Concealed.

In the first frame the Area Revealed is given by the two rectangles:

$$[(x,y),(x1,y1+h)] \text{ and} \quad \text{(Marked A)}$$

$$[(x,y1+h),(x1,y+h)] \quad \text{(Marked B)}$$

the two points represent the top left and bottom right coordinates of the rectangles.

In the last frame the Area Concealed is given by the two rectangles:

$$[(x4,y4),(x4+w,y3)] \text{ and} \quad \text{(Marked C)}$$

$$[(x3+w,y4),(x4+w,y4+h)] \quad \text{(Marked D)}$$

the two points represent the top left and bottom right coordinates of the rectangles.

Any DisplayNoteView that lies within i.e. overlaps the Area Revealed or within the Area Concealed needs to be re-rendered and is marked as dirty. This computation is done by the WindowManager.

The WindowManager then notifies the Renderer which:

Checks if any DisplayNoteView's data is marked dirty and re-renders it to an image which it then uses to update the Page Buffer.

Checks if any DisplayNoteView is marked dirty and re-renders it on the Note Graphical User Interface (NGUI) using the updated position and depth information.

Unique Aspect

One unique aspect about this computation is that instead of finding the overlap of the current mobile electronic display note being dragged across the screen along with the rest of the mobile electronic display notes present on the Note Graphical User Interface, it avoids the redundancy of such a calculation by optimizing the overlap computation of the delta regions i.e. Area Revealed and Area Concealed along with the rest of the mobile electronic display notes and using the computation to update the relative depth of the mobile electronic display notes i.e. Z-indexes of all the mobile electronic display notes computed in the previous animation frame/scene.

This leads to optimized and high performance updating of z-index and hence optimizes the rendering time leading to high performance.

Figure 13:
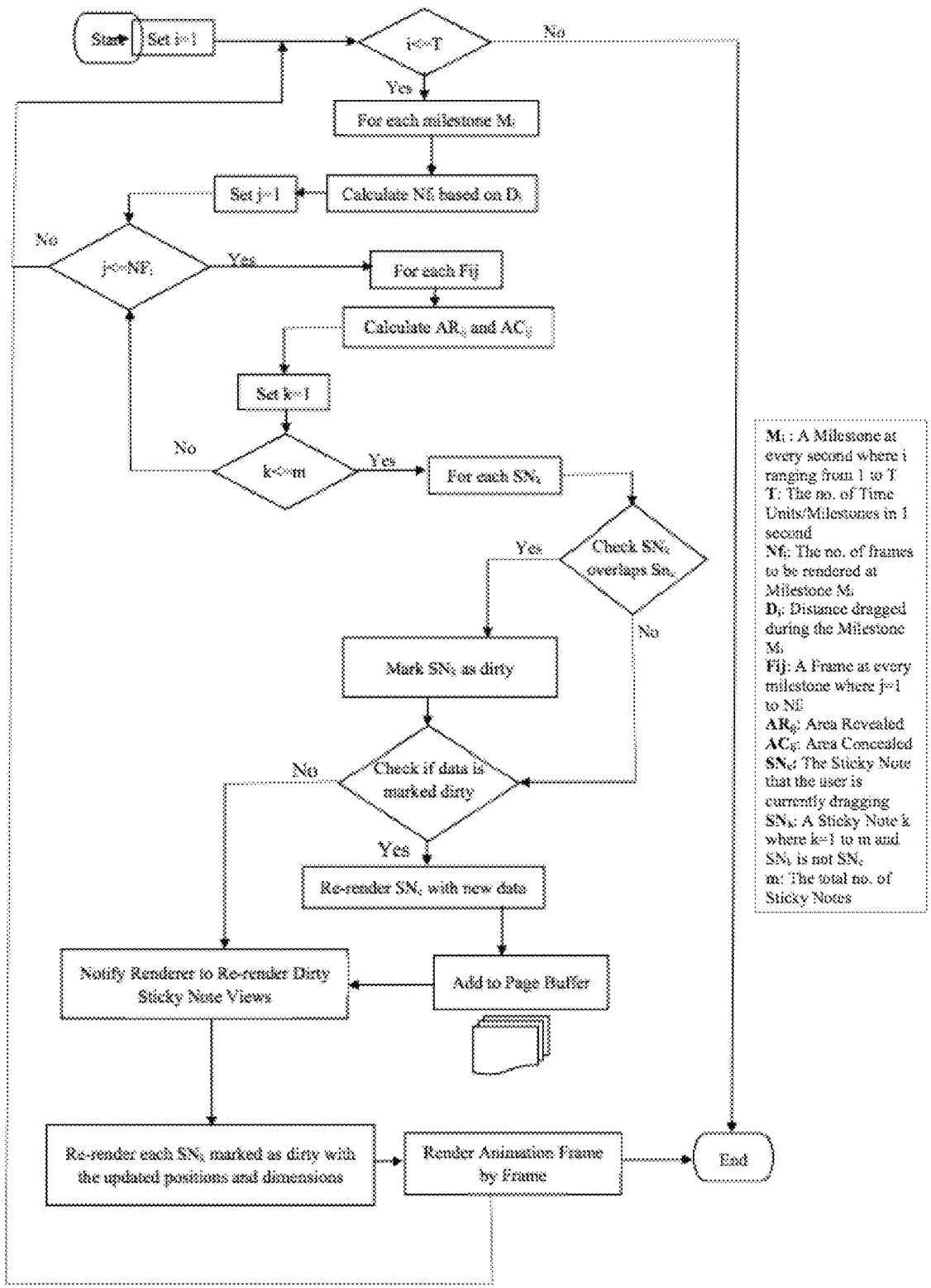
FIG. 13 is a functional block diagram showing computational flow of indexing and rendering decisions.

Referring now to FIG. 13 which shows a functional block diagram showing computational flow of indexing and rendering decisions.

When notified the renderer checks if any of the DisplayNoteViews are dirty and re-renders only those DisplayNoteViews.

This makes the Renderers only re-render the mobile electronic display notes that are changed rather than all the mobile electronic display notes on the Note Graphical User Interface (NGUI).

Example 1

Figure 14:
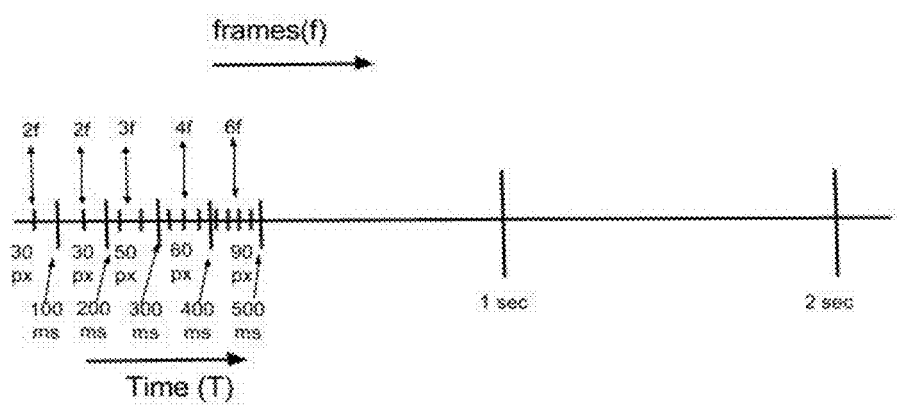
FIG. 14 is a timeline illustration plotting frames rendered against distance moved over time.

Consider the timeline below, referring now to FIG. 14 which shows a timeline illustration plotting frames rendered against distance moved over time.

The example above shows the user accelerating i.e. the distance across each checkpoint is gradually increasing.

The no. of frames to be rendered is denoted by the no. of vertical lines in that checkpoint, eg: in the first checkpoint there are 2 lines denoting 2 frames being rendered.

Assuming that the initial milestone is 10, we set our checkpoints to ⅒th of a second (100 milliseconds)

At each checkpoint the no. of frames to be rendered are calculated based on the distance covered in that checkpoint using the formula:

$$NF = \text{ceil}((Di/Mpx) \times (N\max/T))$$

For Example, at the first checkpoint the user has moved 30 px and hence the no. of frames to be rendered comes to:

$$NF = \text{ceil}((Di/Mpx) \times (N\max/T)) = \text{ceil}(1.8) = 2 \text{ frames}$$

At every second the no. of item units (T) itself can be adapted. For example, if the user is moving very fast for example 5000 px/1 sec then having a checkpoint at every 100 ms would be an overkill.

Hence the no, of milestones in 1 sec i.e. T will be adapted accordingly in order to adjust the user's speed of movement on the screen.

Example 2

In the figures below we can see the user dragging mobile electronic display note (3) across the screen.

Figure 15:
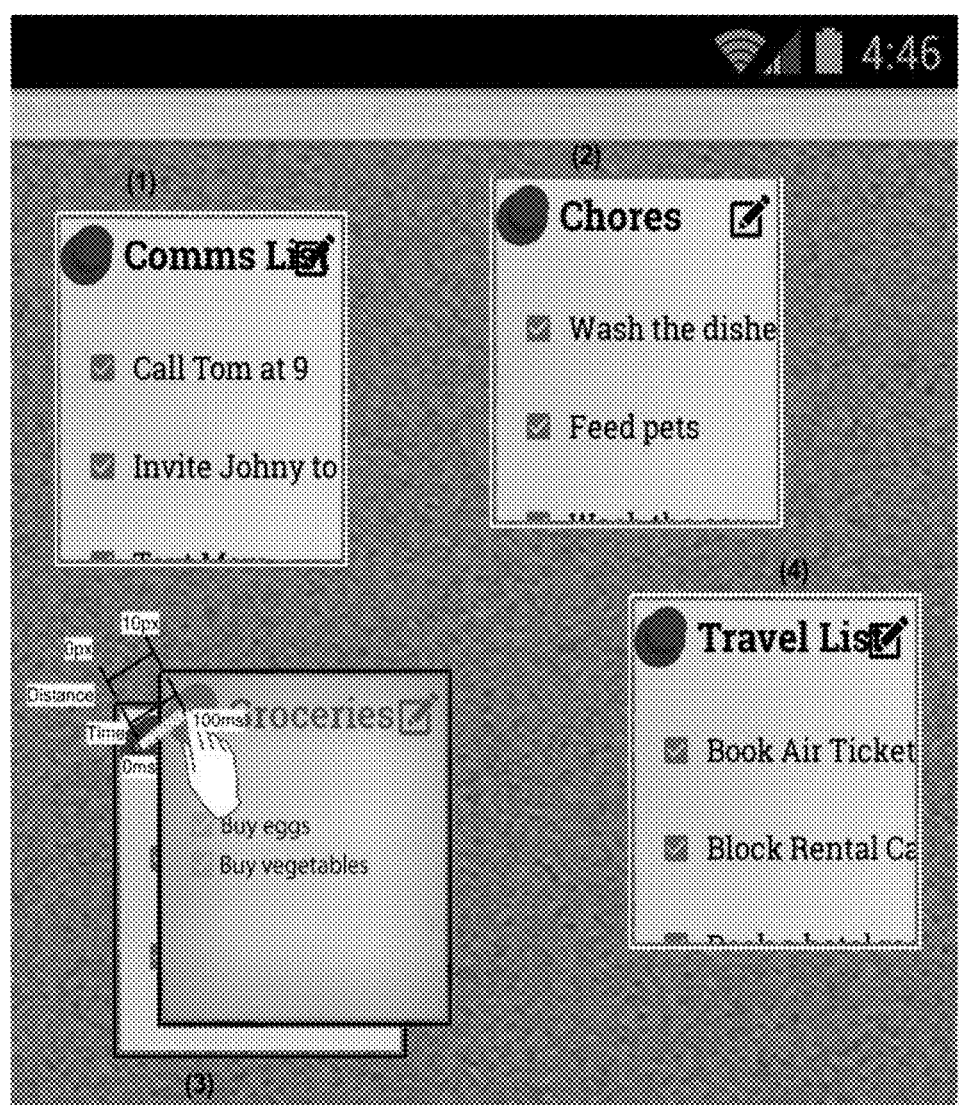
FIG. 15 is an illustrative representation of mobile electronic display notes on a Note Graphical User Interface (NGUI) showing a frame of dragging of a note.

Referring now to FIG. 15 which shows an illustrative representation of mobile electronic display notes on a Note Graphical User Interface (NGUI) showing a frame of dragging of a note.

In FIG. 15 above, the user drags the mobile electronic display note 10 px across the screen in 100 ms. The no. of frames to be rendered are calculated using the formula:

$$NF = \text{ceil}((Di/Mpx) \times (N\max/T)) = \text{ceil}((10/100) \times 6) = \text{ceil}(0.6) = 1$$

and hence 1 frame is rendered.

Figure 16:
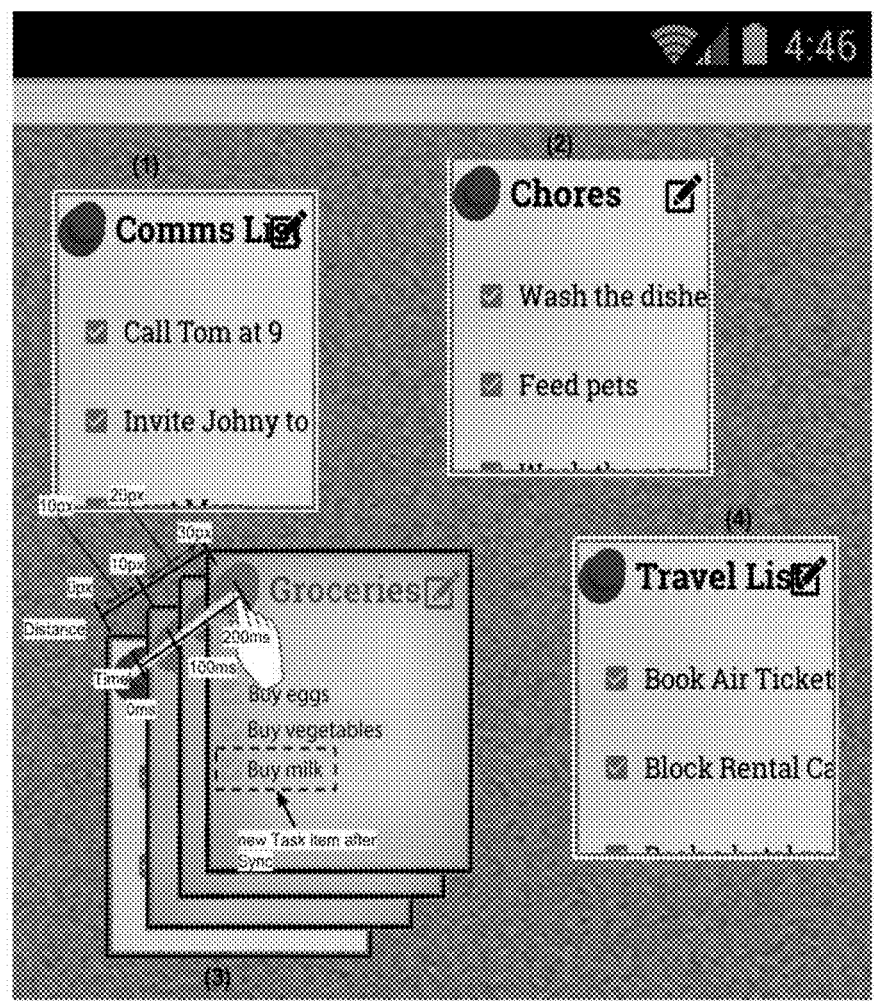
FIG. 16 is an illustrative representation of mobile electronic display notes on a Note Graphical User Interface (NGUI) showing multiple frames of a dragged note.

Referring now to FIG. 16 which shows an illustrative representation of mobile electronic display notes on a Note Graphical User Interface (NGUI) showing multiple frames of a dragged note.

In FIG. 16 above, the user drags the mobile electronic display note another 20 px (to arrive at the 30 px mark) across the screen in the next 100 ms. The no. of frames to be rendered are calculated using the formula:

$$NF = \text{ceil}((Di/Mpx) \times (N\max/T)) = \text{ceil}((20/100) \times 6) = \text{ceil}(1.2) = 2$$

and hence 2 frames are rendered.

Also at this step, the data is updated (another to-do item is added "Buy Milk"). The Renderer notices that the data is dirty and re-renders the mobile electronic display note thus displaying the latest data change.

Figure 17:
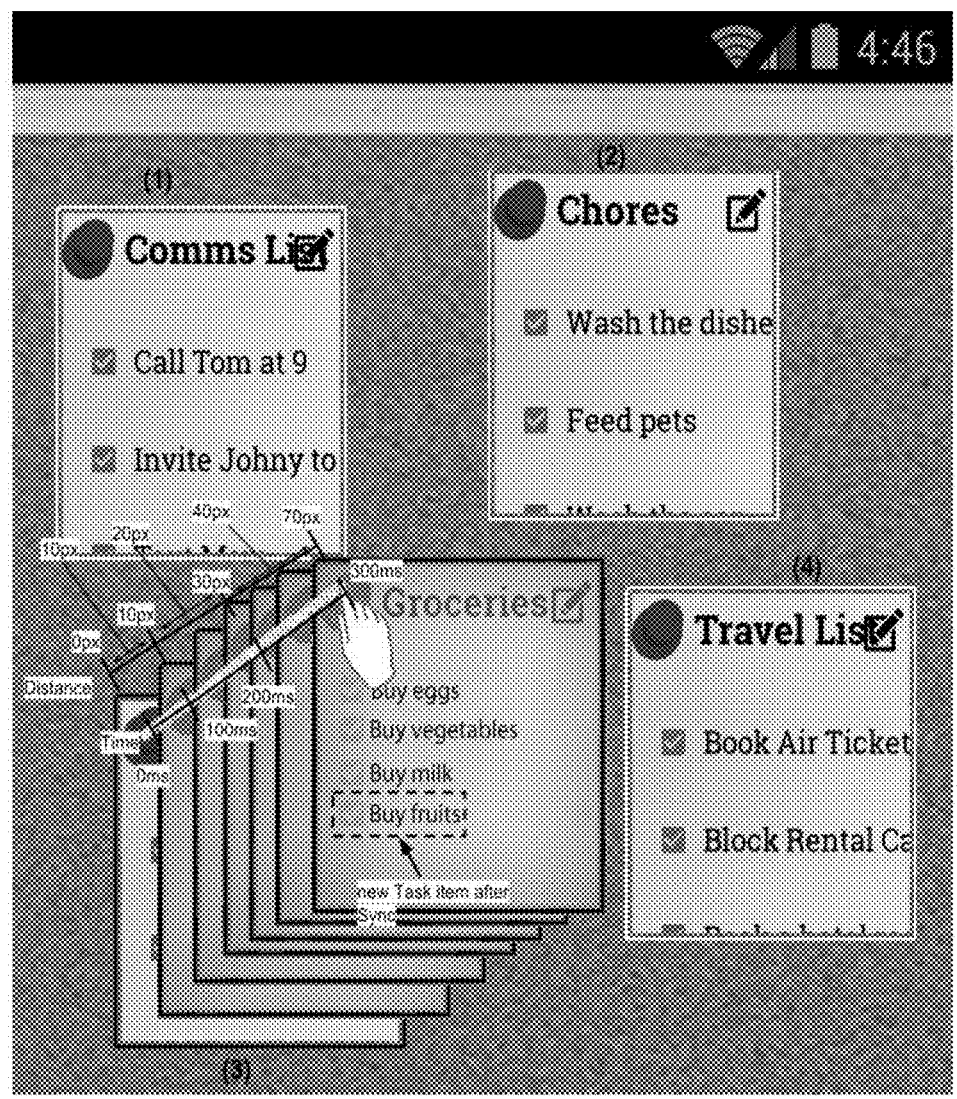
FIG. 17 is an illustrative representation of mobile electronic display notes on a Note Graphical User Interface (NGUI) showing multiple frames of a dragged note with on-the-fly addition of a new task item during frame movement.

Referring now to FIG. 17 which shows an illustrative representation of mobile electronic display notes on a Note Graphical User Interface (NGUI) showing multiple frames of a dragged note with on-the-fly addition of a new task item during frame movement.

In FIG. 17, the user drags the mobile electronic display note another 40 px (to arrive at the 70 px mark) across the screen in the next 100 ms. The no. of frames to be rendered are calculated using the formula:

$$NF = \text{ceil}((Di/Mpx) \times (N\max/T)) = \text{ceil}((40/100) \times 6) = \text{ceil}(2.4) = 3$$

and hence 3 frames are rendered.

Also at this step, the data is updated (another to-do item is added "Buy Fruits"). The Renderer notices that the data is dirty and re-renders the mobile electronic display note thus displaying the latest data change.

Pinch&ZoomManager

The Pinch&ZoomManager is responsible for handling the Pinch Gesture; Pinch In and Pinch Out which is what the user uses to shrink and expand a mobile electronic display note.

When a Pinch gesture is initiated, the view is first brought into focus by following the Tap To Focus flow described earlier.

Feature #2.

Optimal Rendering of mobile electronic display notes while performing a Pinch & Zoom gesture Like in the case of the drag and drop gesture, the mobile electronic display notes are rendered at a max frame rate of Nmax frames per second (e.g. Nmax=60 means maximum of 60 frames per second) but the actual no. of frames rendered is calculated dynamically.

What's different in case of a Pinch & Zoom gesture is there are 4 rectangles of either the Area Concealed (in case the mobile electronic display note is expanding) or the Area Revealed (in case the mobile electronic display note is shrinking).

Figure 18:
FIG. 18 is an illustrative representation of mobile electronic display notes on a Note Graphical User Interface (NGUI) showing pinch and zoom of a note.

Referring now to FIG. 18 which shows an illustrative representation of mobile electronic display notes on a Note Graphical User Interface (NGUI) showing pinch and zoom of a note.

We can see that the mobile electronic display note is expanding from (x1,y2) to (x2,y2). Since the mobile electronic display note is expanding, we calculate a Delta (?) of the Area Concealed.

The Area Revealed is given by the 4 rectangles below:

$$[(x2,y2),(x2+W2,y1)] \text{ Top}$$

$$[(x2,y2),(x1,y2+H2)] \text{ Left}$$

$$[(x2,y1+H1),(x2+W2,y1+H1)] \text{ Bottom}$$

$$[(x1+w1,y2),(x2+W2,y2+H2)] \text{ Right}$$

the two points in each of the rectangles above represent the top left and bottom right coordinates of the rectangles.

Any DisplayNoteView that lies within the Area Revealed or within the Area Concealed needs to be re-rendered and is marked as dirty.

When notified the renderer checks if any of the DisplayNoteViews are dirty and re-renders only those DisplayNoteViews.

This makes the Renderers only re-render the mobile electronic display notes that are changed rather than all the mobile electronic display notes on the Note Graphical User Interface (NGUI).

Figure 19:
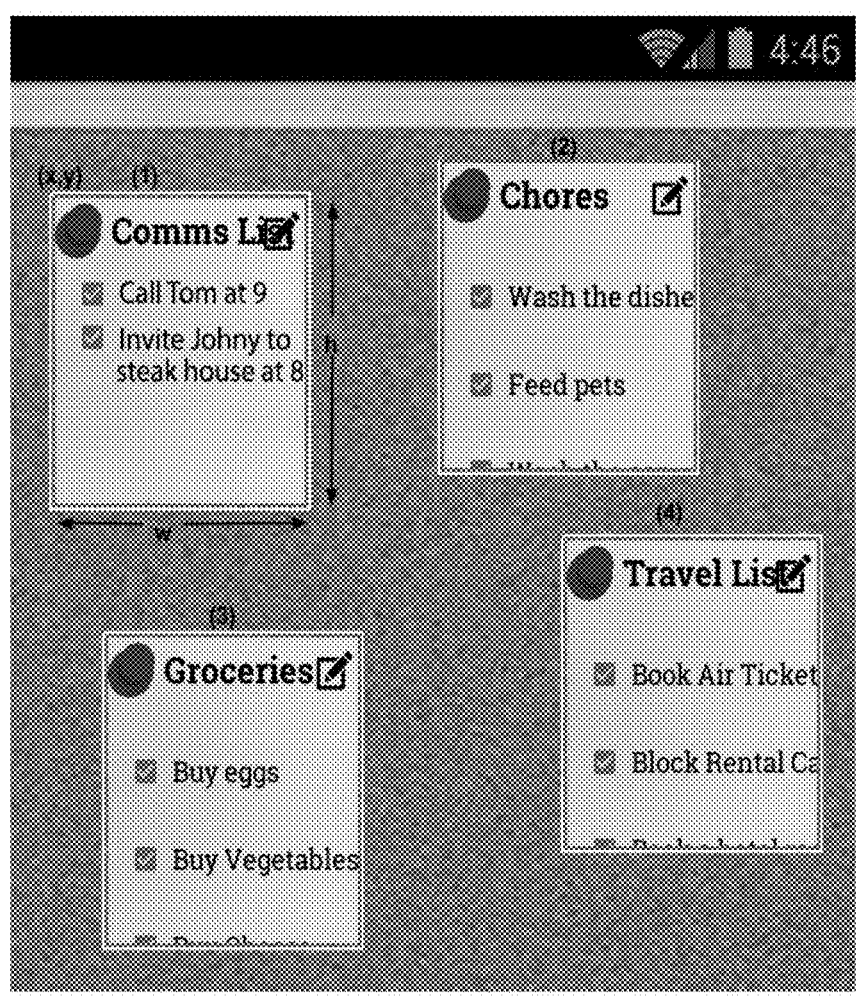
FIG. 19 is an illustrative representation of mobile electronic display notes on a Note Graphical User Interface (NGUI) showing details of pinch and zoom handling.

Referring now to FIG. 19 which shows an illustrative representation of mobile electronic display notes on a Note Graphical User Interface (NGUI) showing details of pinch and zoom handling.

At every step of a Pinch, the WindowManager calculates the new view's position and dimensions based on the following formulas:

If Expanding $$h1=h*r$$

$$w1=w*r$$

$$x1=x-\text{round}((w1-w)/2)$$

$$y1=y-\text{round}((h1-h)/2)$$

where r is the ratio variable (w1−w) is the change/increase in the width in the x direction (horizontal) and (h1−h) is the change/increase in the height in the y direction (vertical)

We subtract (w1−w)/2 from the x coordinate because the size increases equally in the left half and right half of the mobile electronic display note.

Similarly, we subtract (h1−h)/2 from the y coordinate because the size increases equally in the upper half and lower half of the mobile electronic display note.

If Shrinking $$h1=h*r$$

$$w1=w*r$$

$$x1=x+\text{round}((w-w1)/2)$$

$$y1=y+\text{round}((h-h1)/2)$$

where r is the ratio variable (w−w1) is the change/decrease in the width in the x direction (horizontal) and (h−h1) is the change/decrease in the height in the y direction (vertical)

We add (w−w1)/2 to the x coordinate because the size decreases equally in the left half and right half of the mobile electronic display note.

Similarly, we add (h-h1)/2 to the y coordinate because the size decreases equally in the upper half and lower half of the mobile electronic display note.

Scene 1 (Pinch-out)

Figure 20:
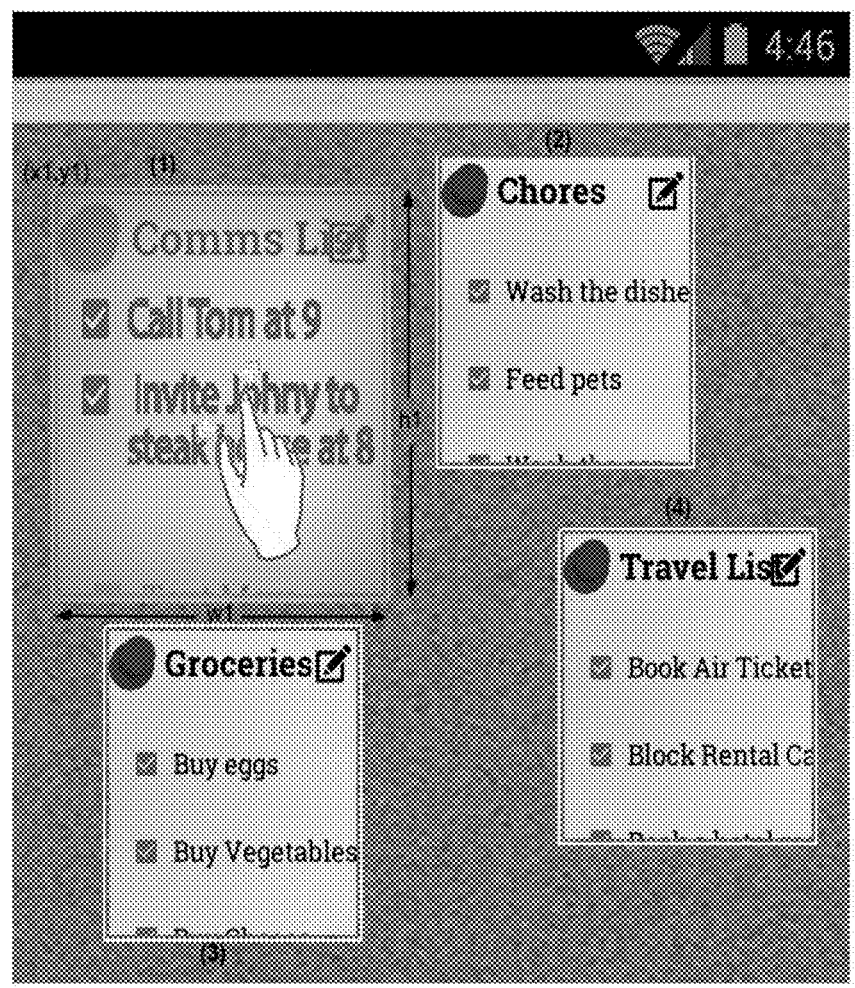
FIG. 20 is an illustrative representation of mobile electronic display notes on a Note Graphical User Interface (NGUI) showing details of pinch and zoom with a note being zoomed and the view/display size increased.

Referring now to FIG. 20 which shows an illustrative representation of mobile electronic display notes on a Note Graphical User Interface (NGUI) showing details of pinch and zoom with a note being zoomed and the view/display size increased.

Here we can see the DisplayNoteView (1) being zoomed (increased in scale) from it's original position (x,y) and new dimensions (w, h) to a new position (x1,y1) and the new dimension (w1, h1).

For example if the DisplayNoteView was increased by 10%, hence r=1.1 and assuming:

$$x=5\text{px}, y=5 \text{ px}, w=10 \text{ px}, h=10 \text{ px}$$

$$h1=h*r=10\times1.1=11 \text{ px}$$

$$w1=w*r=10\times1.1=11 \text{ px}$$

$$x1=x-\text{round}((w1-w)/2)=5-\text{round}((11-10)/2)=4$$

$$y1=y-\text{round}((h1-h)/2)=5-\text{round}((11-10)/2)=4$$

Since the mobile electronic display note is expanding, the WindowManager calculates the Area Concealed and then checks if any other DisplayNoteView intersects this area. In this case it doesn't so it just marks this DisplayNoteView (1) as dirty and notifies the renderer.

The renderer then checks for and re-renders any DisplayNoteViews which are marked as dirty. In this case it only re-renders the current DisplayNoteView (1).

Scene 2 (Pinch-Out)

Figure 21:
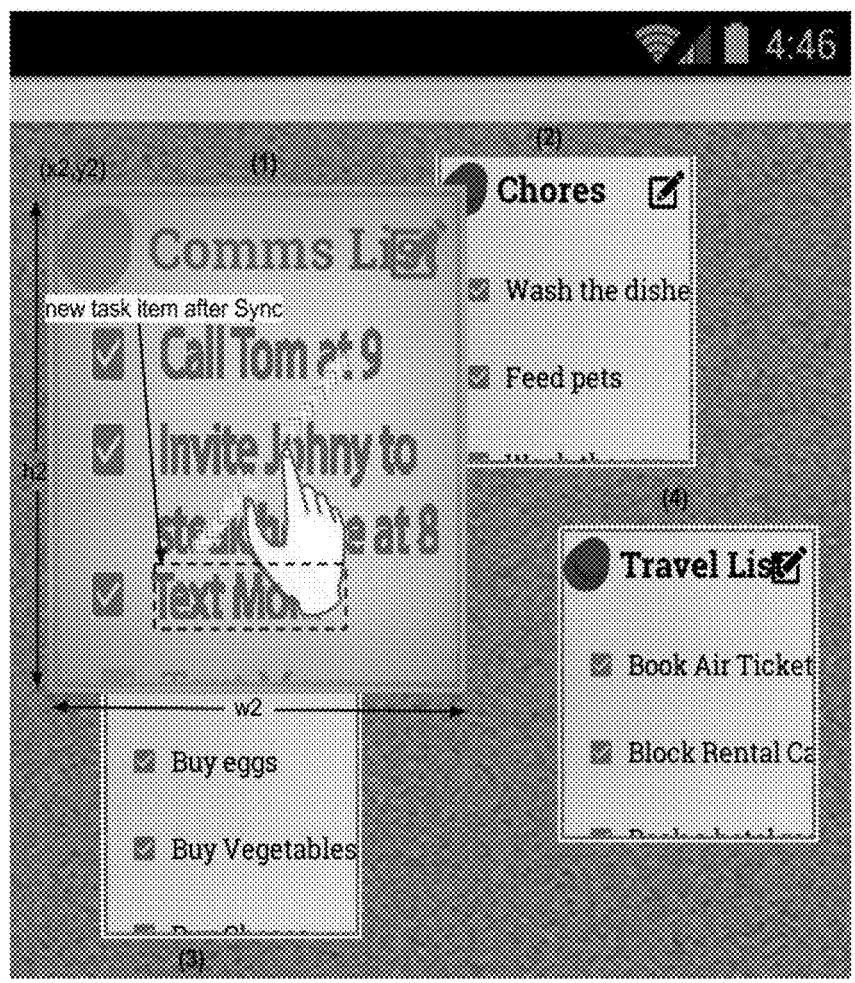
FIG. 21 is an illustrative representation of mobile electronic display notes on a Note Graphical User Interface (NGUI) showing details of pinch and zoom with a note being zoomed-in (pinched out) and the view/display size increased with on-the-fly addition of a new task item during frame movement.

Referring now to FIG. 21 which shows an illustrative representation of mobile electronic display notes on a Note Graphical User Interface (NGUI) showing details of pinch and zoom with a note being zoomed-in (pinched out) and the view/display size increased with on-the-fly addition of a new task item during frame movement.

Here we can see the DisplayNoteView (1) being zoomed (increased in scale) from the position (x1,y1) and dimensions (w1,h1) to a new position (x2,y2) and new dimensions (w2,h2).

This time when the WindowManager calculates the Area Concealed and checks if any other DisplayNoteView intersects this area, it finds that DisplayNoteView 2 and DisplayNoteView (3) intersect and marks them (2) & (3) as well as this DisplayNoteView (1) as dirty and notifies the Z-Index Manager to recalculate the Z-Indices of the views making this view have a higher Z-Index.

Also at this step, the data is updated (another to-do item is added "Text Mom"). The Renderer notices that the data is dirty and re-renders the mobile electronic display note thus displaying the latest data change.

The renderer then checks for and re-renders any DisplayNoteViews which are marked as dirty. In this case it re-renders the current DisplayNoteView (1) along with DisplayNoteViews (2) & (3).

Scene 3 (Pinch-in)

Figure 22:
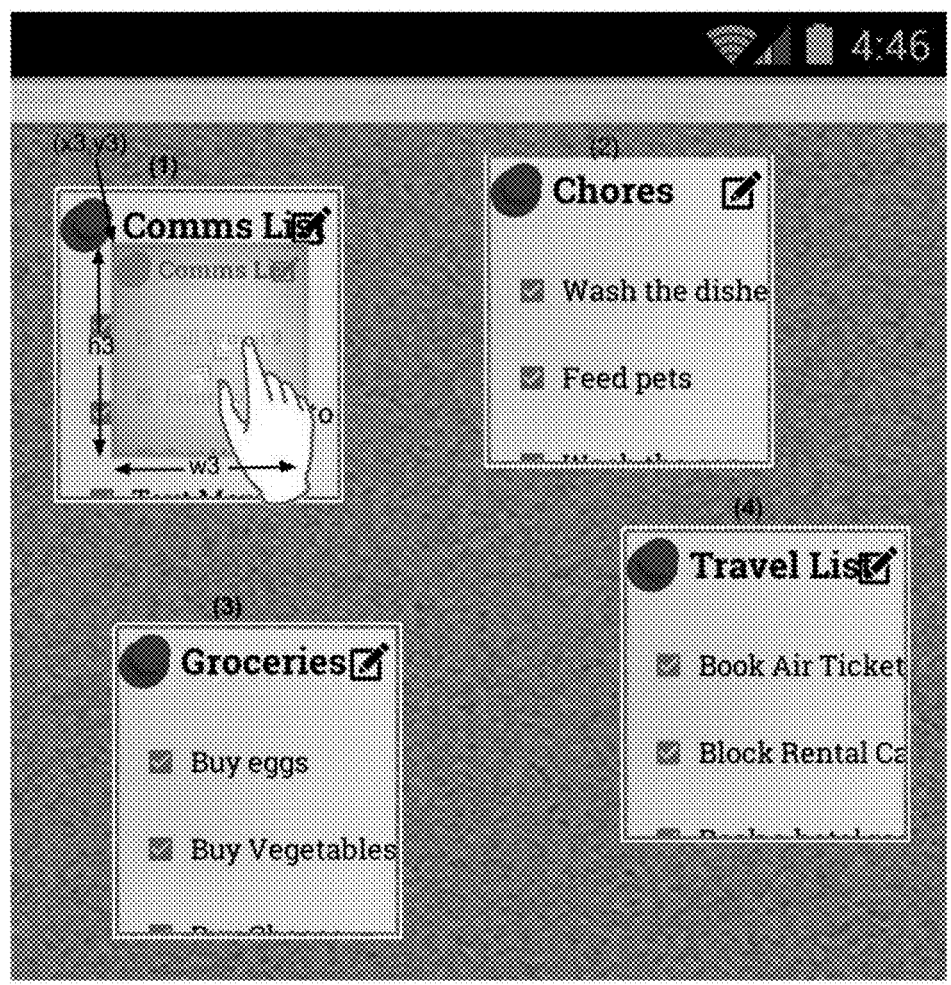
FIG. 22 is an illustrative representation of mobile electronic display notes on a Note Graphical User Interface (NGUI) showing details of pinch and zoom with a note being zoomed-out (pinched in) and the view/display size decreased.

Referring now to FIG. 22 which shows an illustrative representation of mobile electronic display notes on a Note Graphical User Interface (NGUI) showing details of pinch and zoom with a note being zoomed-out (pinched in) and the view/display size decreased.

Scene 3:

Here we can see the DisplayNoteView (1) being zoomed-out (decreased in scale) from the position (x2,y2) and the dimensions (w2,h2) to a new position (x3,y3) and new dimensions (w3,h3) which is smaller.

For example if the DisplayNoteView was decreased by 10%, hence r=0.9 and assuming:

$$x=5 \text{ px}, y=5 \text{ px}, w=10 \text{ px}, h=10 \text{ px}$$

$$h1=h*r=10\times0.9=9 \text{ px}$$

$$w1=w*r=10\times0.9=9 \text{ px}$$

$$x1=x+\text{round}((w-w1)/2)=5+\text{round}((10-9)/2)=6$$

$$y1=y+\text{round}((h-h1)/2)=5+\text{round}((10-0)/2)=6$$

Since the mobile electronic display note is decreasing in size, the WindowManager calculates the Area Revealed and then checks if any other DisplayNoteView intersects this area. In this case it doesn't so it just marks this DisplayNoteView (1) as dirty and notifies the renderer.

The renderer then checks for and re-renders any DisplayNoteViews which are marked as dirty. In this case it only re-renderes the current DisplayNoteView (1).

Feature #3.

Mapping Text Input to Mobile Electronic Display Notes

The NLP Engine can map a text input given by the user to a mobile electronic display note. For example, words like "buy", "purchase" or "shop" are linked to the Semantic Action "BUY" while words like "travel", "fly", "drive", "commute" refer to the Semantic Action "NAVIGATE" and hence any Travel related mobile electronic display notes that might be present. In the same way, common noun words such as "table", "chair", "desk" resolve to Semantic Concept/Entity "FURNITURE" and proper noun words such as "John", "Jane", "Jack" resolve to Semantic Concept/Entity "PERSON"

Figure 23A:
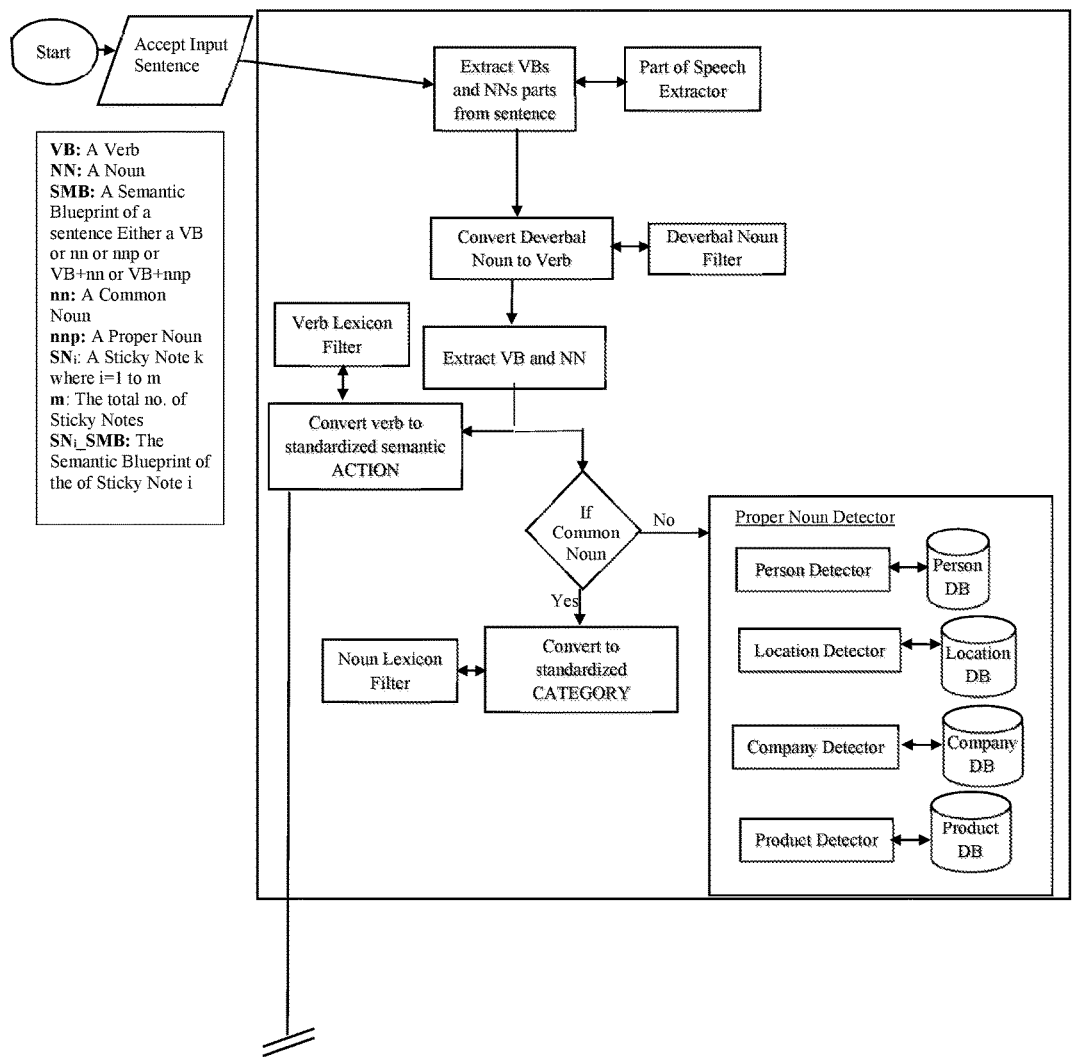
FIGS. 23a (top portion) and 23b (lower portion) is, as a combined figure a functional block diagram showing a feature that allows mapping of text input to mobile electronic display note.
Figure 23B:
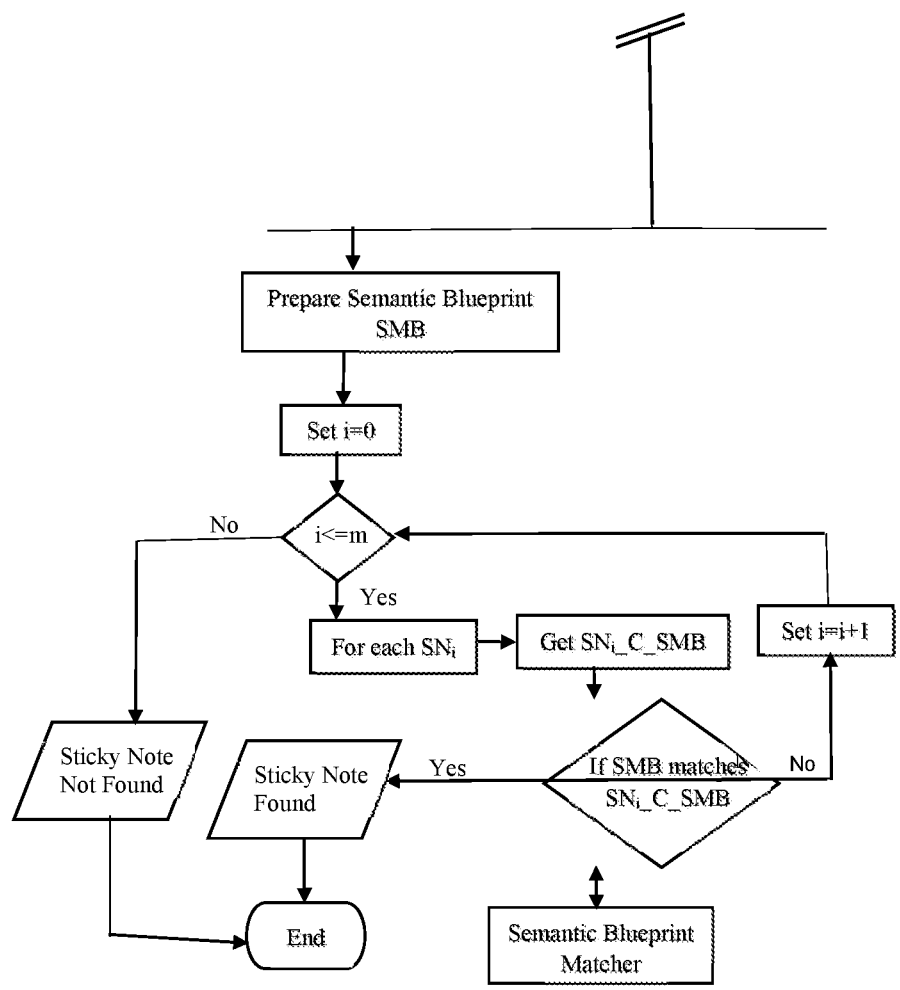

Referring now to FIG. 23A AND FIG. 23B, FIG. 23a (top portion) and FIG. 23b (lower portion) is, as a combined figure a functional block diagram showing a feature that allows mapping of text input to mobile electronic display note.

Whenever a mobile electronic display note is created the above process is applied to the Title and/or Content (lines of text inside a particular mobile electronic display note) of the mobile electronic display note to create a Semantic Blueprint SN SMB of the mobile electronic display note as a whole. This is re-calculated when either the Title or the Content of the mobile electronic display note changes.

The NLP Engine accepts a sentence to extract the Verb (VB) and Noun (NN) parts of the sentence using Part of Speech Extractor. Either of the Verb or the Noun or both might be present.

The Deverbal Noun Filter converts any Deverbal Noun (if present) to the Verb form of the Deverbal Noun. For example, "Shopping" is a Deverbal Noun which is converted to the verb "Shop" by the Filter.

The Verb and Noun portions are extracted and processed separately.

The Verb is processed by the Verb Lexicon Matching Filter and is converted to a Standardized Semantic ACTION. For example: the simple English vers "purchase", "procure" or "buy" are converted to the Semantic Action BUY. In the same way English words such as "talk", "spoke", "get in touch with", "contact" are converted to Semantic Action COMMUNICATE. Similarly words indicating motion or travel e.g. simple English words like "fly", "rush", "go", "travel", "ride", "drive", "walk", "run" etc will be converted to Semantic Action NAVIGATE.

Note that variations in the meaning of words such as "drive", "run", "fly", "move" are abstracted to the standardized meaning NAVIGATE (which represents movement).

The Noun also gets processed in parallel using a multi-threaded approach.

If the Noun is a Common Noun (NN) it gets processed by a Noun Lexicon Filter which maps the noun synonym words like "chair", "table", "desk" etc. to a standardized category FURNITURE.

If the Noun is a Proper Noun (NNP) it gets processed by the Proper Noun Detector which checks with its 4 components Person Detector, Location Detector, Company Detector and Product Detector and responds back with the type of the Proper Noun. Each of these components have their own Databases which they use to map the Proper Noun to a type. For example: in the sentence "Call John", John gets mapped to a PERSON type by the Person Detector.

Finally, we obtain a Semantic Blueprint of the sentence (SMB) which is of the form VB+NN or VB+NNP or VB or NN or NNP.

This Semantic Blueprint (SMB) is matched against all the Semantic Blueprint of all the mobile electronic display notes SNi_SMB for all mobile electronic display notes (SNi) where i=0 to m which is the total no. of mobile electronic display notes.

If the Semantic Blueprints of a mobile electronic display note and the derived Semantic Blueprint of the input sentence match, the mobile electronic display note is returned.

For example:

If the user adds "What am I buying today?"

Figure 24:
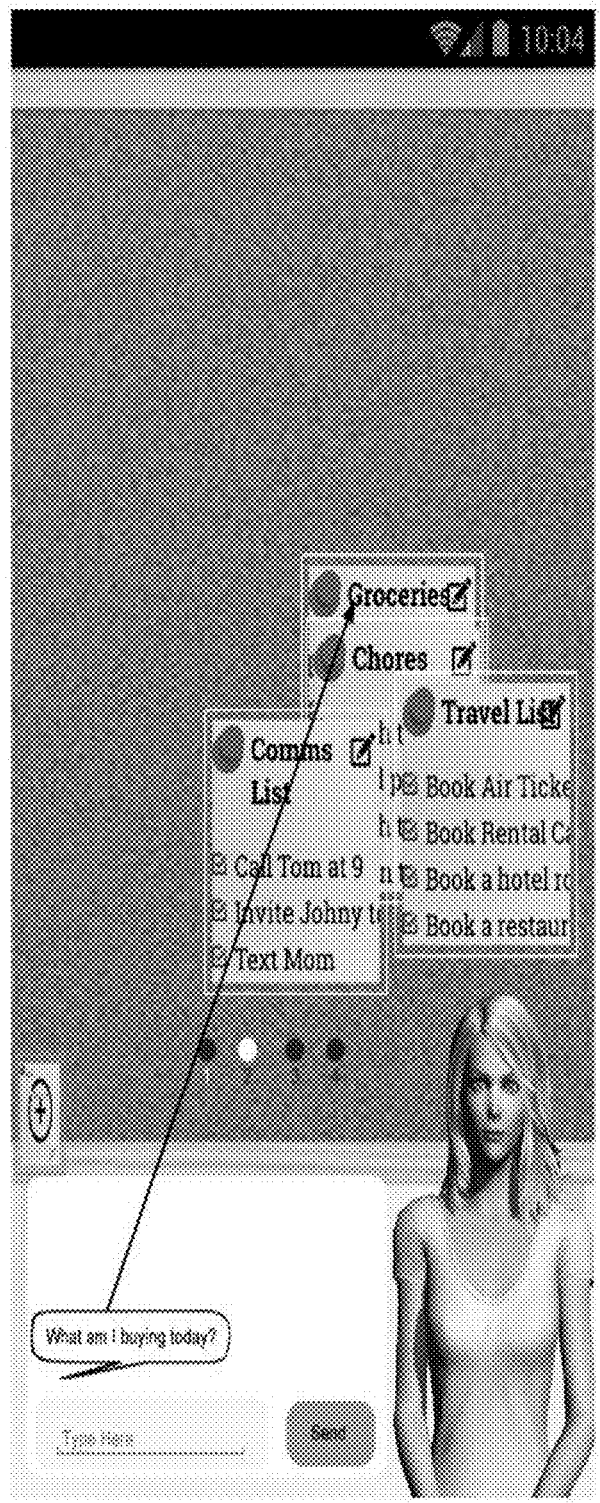
FIG. 24 is an illustrative representation of mobile electronic display notes on a Note Graphical User Interface (NGUI) showing a virtual intelligent agent as a graphic interface for natural language processing of verbal input.

Referring now to FIG. 24 which shows an illustrative representation of mobile electronic display notes on a Note Graphical User Interface (NGUI) showing a virtual intelligent agent as a graphic interface for natural language processing of verbal input.

1. This sentence is sent to the NLP Engine which extracts the noun "buying".
2. The Deverbal Noun Converter converts "buying" to "buy".

3. The Verb Lexicon Filter maps "buy" to the Standardized Semantic Action BUY.
4. This forms the Semantic Blueprint (SMB) for this sentence which is then matched against the SMBs of all the mobile electronic display notes.

The SMB of the Groceries Note matches with the SMB BUY hence this mobile electronic display note is returned.

The next section will describe how the Intelligent Agent brings this note in the foreground, expands it and begins reading the contents of the note to the user.

Feature #4.

Intelligent Agent automatically operating the GUI without the user touching the device The application contains a unique method of automatically executing GUI operations e.g. tapping, swiping, pinching etc by an intelligent virtual assistant without any user intervention using:

4.0 an automatic method of planning the GUI operations (e.g. PLAN START
  i. do page navigation 3 times to the right,
  ii. select the mobile electronic display note X and bring it on the front,
  iii. go to the Edit view of the mobile electronic display note X,
  iv. find the required line item and highlight it,
  v. wait for user input,
  vi. then close the mobile electronic display note X
5. PLAN END
)
in order to automatically carry out the intended GUI actions/operations for showing the search results to the user on the screen without any manual user intervention.

4.1. an automatic method of navigating from source page to destination page containing the intended target mobile electronic display note, 4.2. an automatic method of bringing the required mobile electronic display note in front of other mobile electronic display notes surrounding it by adjusting the depth of the required mobile electronic display note using automated point and clicking/tapping on any exposed region of the required mobile electronic display note.

4.3. an automatic method of finding overlaps between the required mobile electronic display note and the surrounding mobile electronic display notes using Automated Overlap Detector Module that calculates the exposed region of the required mobile electronic display note on the destination page 4.4 an automated method of creating virtual events along with the GUI parameters (e.g.
  position, distance, time, trajectory) and executing these virtual events on the Note GUI.

4.5 and updating the users about the progress of execution of these Virtual Events in realtime by rendering an animation which shows the Personal Virtual Assistant (PVA) APPARENTLY performing these Virtual Events ON ITS OWN by animating its body, face, moving its hands and changing the orientation etc.

4.6 a method of interpreting the virtual events by the Virtual Event Interpreter Module and actually execute them on the device as if they were performed by a human user.

The Technical Architecture shown in the below mentioned figure has the following components 6. An Automated Overlap Detector which automatically computes overlaps between mobile electronic display notes.

7. A Virtual Event Planner which creates an entire plan of steps that include virtual events along with the user interaction parameters (e.g. position, distance, time, trajectory). The entire plan is handed over to the Virtual Event Performer.

8. A Virtual Event Performer which co-ordinates the various virtual events in the Event Plan generated by the Simulated Virtual Event Planner means it executes the events by pushing them into the Virtual Event Queue and depending on the delays between the steps it will either:
  a. Not wait at all and just execute the 2nd virtual event immediately after pushing the 1st virtual event into the virtual event queue.
  b. Wait for the completion of execution of virtual event 1 and get such a notification of completion by the interpreter before moving on to virtual event 2.
  c. Wait for a configured delay (as decided by the PLANNER) between performing virtual event 1 and virtual event 2.

9. A Virtual Event Interpreter which picks up Virtual Events from the Virtual Event Queue and executes them on the GUI along with animating the Personal Virtual Assistant as performing the gestures corresponding to the Virtual Events and then notifying the Virtual Event Performer of the completion of the Virtual Event.

10. A Virtual Assistant Animation Engine which reads the information contained in the Virtual Event and performs a series of animations to complement the Virtual Event. For example for a Tap Virtual Event the Virtual Assistant Animation Engine reads the Rectangular region for the Tap and:
  a. Calculates the center of gravity of the Rectangle.
  b. Performs a Rotate Body Animation to rotate towards the Note Graphical User Interface (NGUI).
  c. Performs a Point Hand Animation to point the hand at the calculated center of gravity.
  d. Performs a Tap Animation which shows Intelligent Interactive Agent tapping her hand down like tapping down on a button.

Figure 25:
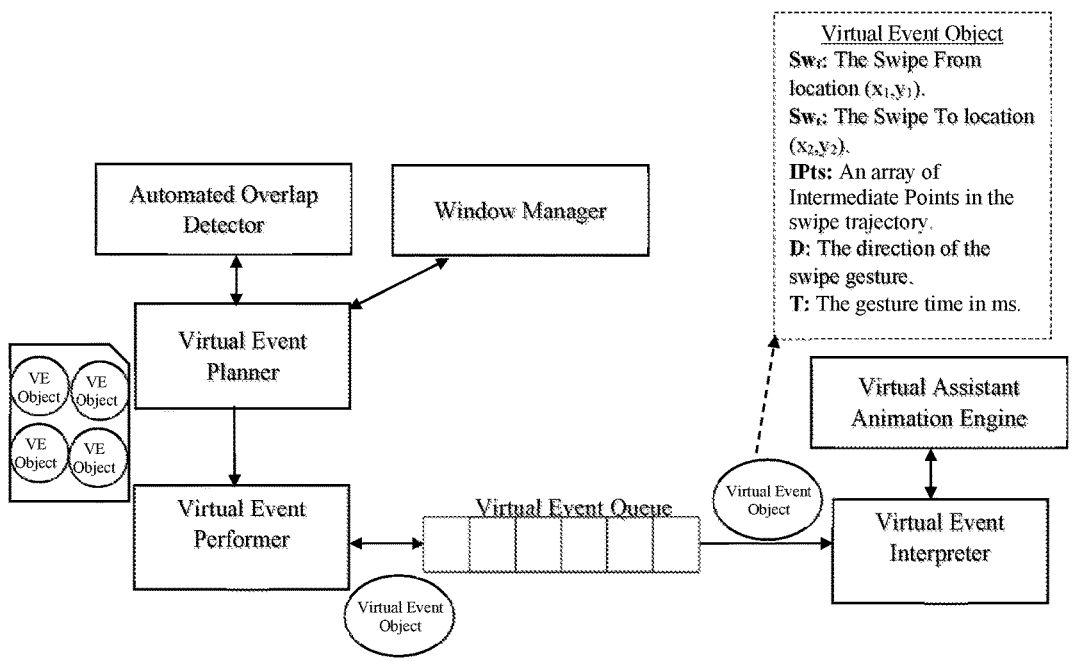
FIG. 25 is a functional block diagram showing how the intelligent agent can automatically operate the GUI without requiring a user to touch the device.

Referring now to FIG. 25 which shows a functional block diagram showing how the intelligent agent can automatically operate the GUI without requiring a user to touch the device.

A Virtual Event is like an actual event except that instead of being triggered by the user (like the user tapping the screen area corresponding to a mobile electronic display note) it is triggered programmatically as a part of a Event Plan in response to a user requirement (implied, inferred, scheduled or explicitly stated by the user using voice instructions dictated to the device in a hands free manner). A single Virtual Event object encapsulates the entire aspect of the Gesture. For example, a swipe event encapsulates the following aspects of a Swipe Gesture:

$D=\text{"right-left"}$ $T=200$ ms $Swf=(400,400)$ $Swt=(100,100)$ $IPts=[(250,200)]$ Where:
D is the direction of the Swipe gesture.
T is the Time Period of the gesture.
Swf is the Swipe from location
Swt is the Swipe to location IPts is an array of Intermediate Points (optional). If any intermediate points are given like in this example, an arc is plotted between the $Sw_f$, Swt and the IPts.

Figure 26:
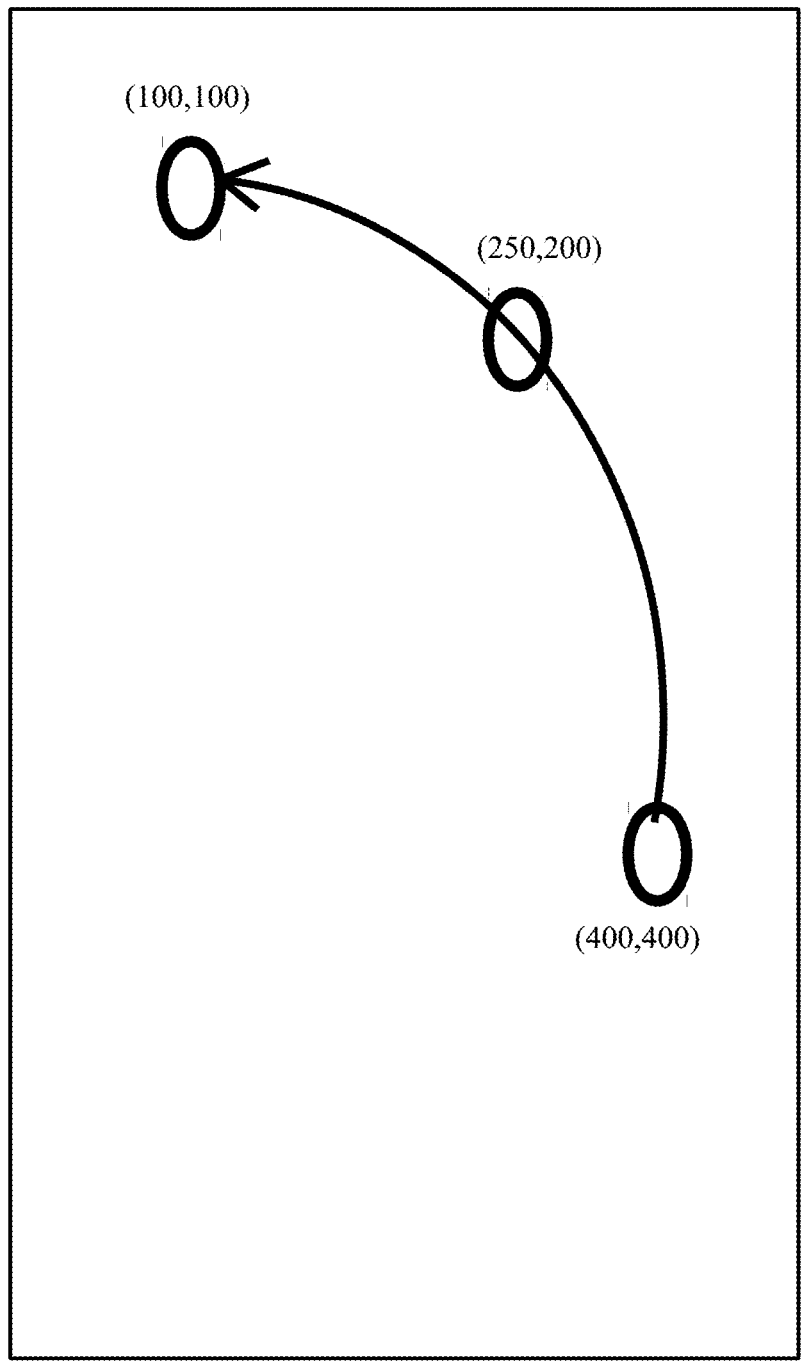
FIG. 26 is a line graph showing intermediate points of a virtual swipe.

Referring now to FIG. 26 which shows a line graph showing intermediate points of a virtual swipe.

Example

If the user speaks a sentence "What groceries am I getting?" or "What do I need to buy today", the application figures out the mobile electronic display note that corresponds to this query using the approach described in Feature #3 (Mapping text input to mobile electronic display notes) and now needs to display the mobile electronic display note to the user.

The flowchart and the description below explains the process of show this mobile electronic display note to the user.

Figure 27:
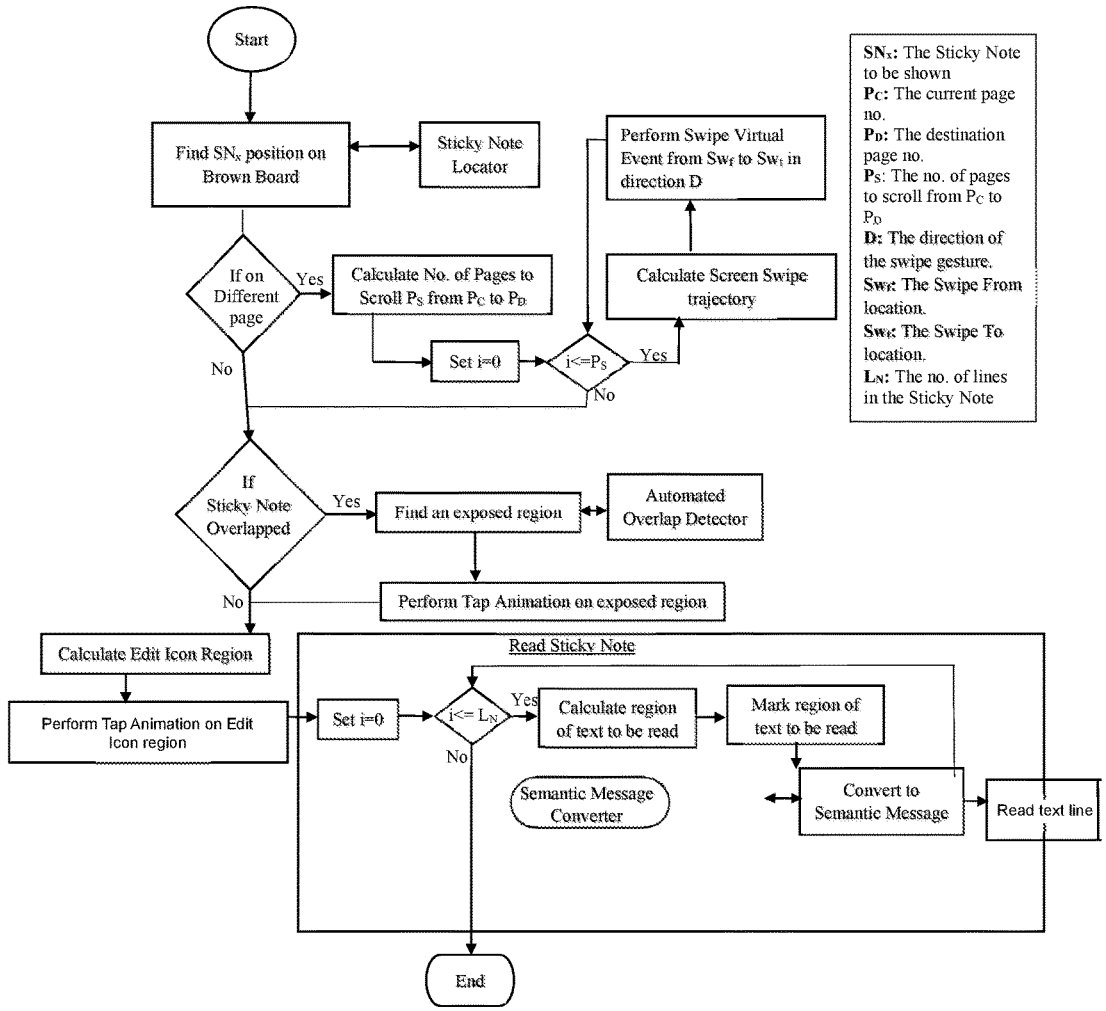
FIG. 27 is a functional block diagram showing the navigation to a mobile electronic display note across sections of the Note Graphical User Interface (NGUI) and then the display of the mobile electronic display note in an expanded view followed by reading the content of the mobile electronic display note using an NLP Parser.

Referring now to FIG. 27 which shows the navigation to a mobile electronic display note across sections of the Note Graphical User Interface (NGUI) and then the display of the mobile electronic display note in an expanded view followed by reading the content of the mobile electronic display note using an NLP Parser.

After getting the mobile electronic display note that the user is interested in, the mobile electronic display note Locator Module is used to find the page number on which the mobile electronic display note is located and the position coordinates of the mobile electronic display note on that page.

If the mobile electronic display note is not on the current page:

The no. of pages to scroll are calculated:

If the mobile electronic display note is located on page no. PN and the current page is page no. PC then the no. of pages to scroll and Direction D is given by:

$$PS=PD-PC, D=\text{"left-right"} \text{ if } PD>PC$$

$$PS=PC-PD, D=\text{"right-left"} \text{ if } PD<PC$$

A Swipe Virtual Event is triggered Ps no. of times using the Virtual Event Performer with the parameters: Direction D, and the swipe-from Swf and swipe-to Swt locations which are calculated as follows:

Assuming the Note Graphical User Interface (NGUI) is positioned at coordinates (0,0), having a height h and width w and direction D "right-left", the swipe-from Swf and swipe-to Swt locations are given by:

$$Swfx=w/2+w/4$$

$$Swfy=h/2+h/4$$

Hence, $Swf=((w/2+w/4),(h/2+h/4))$ $$Swtx=w/4$$

$$Swty=h/2+h/4$$

Hence, $Swt=((w/4),(h/2+h/4))$

Similarly, if the direction D was "left-right":

$$Swf=((w/4),(h/2+h/4))$$

$$Swt=((w/2+w/4),(h/2+h/4))$$

Figure 28:
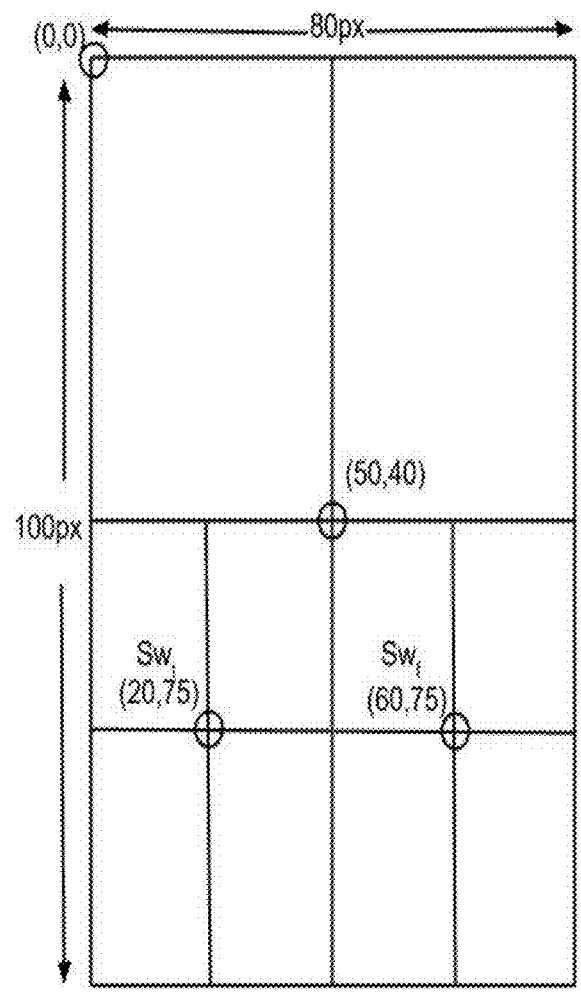
FIG. 28 is a line illustration of a Note Graphical User Interface (NGUI) mobile electronic display note container showing a swipe event's start location ($Sw_f$) and end location ($Sw_t$).

For example, if the Note Graphical User Interface (NGUI) is positioned at coordinates (0,0), has a height of 100 px and a width of 80 px and is being swiped from right to left:

Referring now to FIG. 28 which shows a line illustration of a Note Graphical User Interface (NGUI) mobile electronic display note container showing a swipe event's start location ($Sw_f$) and end location ($Sw_t$).

$$Swf=((w/2+w/4),(h/2+h/4))=((80/2+80/4),(100/2+100/4))$$

$$=((40+20),(50+25))=(60,75)$$

$$Swt=((w/4),(h/2+h/4))=((80/4),(100/2+100/4))$$

$$=((20),(50+25))=(20,75)$$

Figure 29:
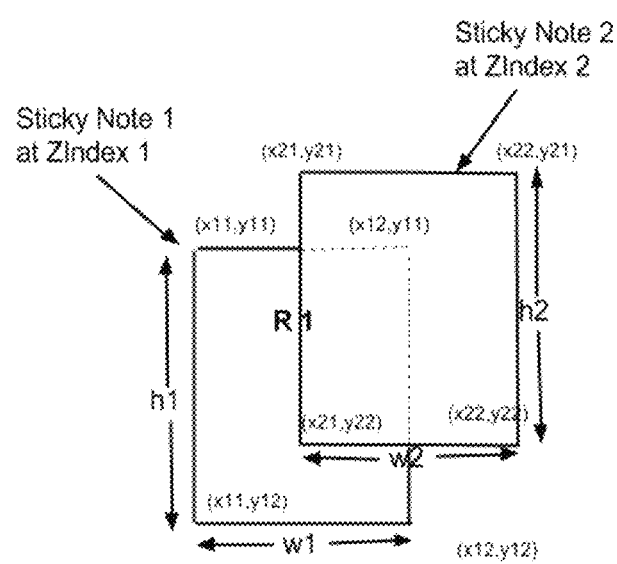
FIG. 29 is a line illustration showing how notes can overlap after being subjected to a virtual swipe and how exposed regions can be extracted.

The Window Manager checks using the Automated Overlap Detector (AOD) module if this mobile electronic display note is overlapped by any other mobile electronic display note, and if it is then the AOD module uses the following algorithm to find an exposed region a Tap Virtual Event to be triggered on (and bring the note above the overlapping mobile electronic display notes):

For every mobile electronic display note SNi where i=1 to M and M is the no. of mobile electronic display notes that overlap with (have a higher Z-Index than) this mobile electronic display note find the regions exposed:

Referring now to FIG. 29 which shows a line illustration showing how notes can overlap after being subjected to a virtual swipe and how exposed regions can be extracted.

If the mobile electronic display notes overlap like in the example above, the following 3 exposed regions are extracted.

Figure 30:
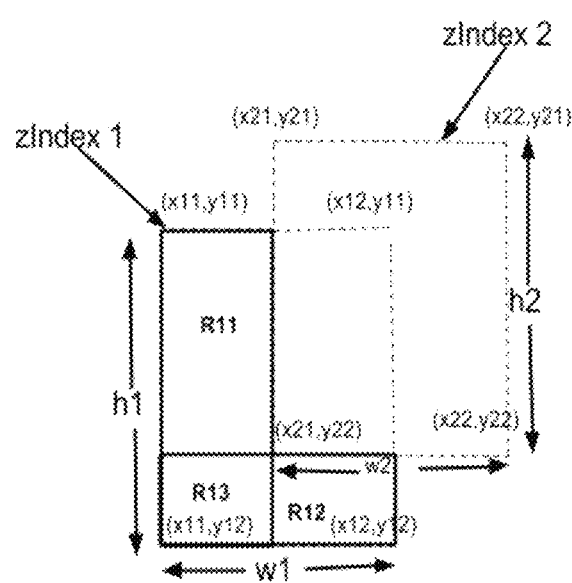
FIG. 30 is a detail of a line illustration of overlapping notes showing calculation of the area revealed and area concealed.

Referring now to FIG. 30 which shows a detail of a line illustration of overlapping notes showing calculation of the area revealed and area concealed.

Where R11, R12 and R13 above are rectangle denoted by:

$$R11=(x11,y11)(x21,y22)$$

$$R12=(x21,y22)(x12,y12)$$

$$R13=(x11,y22)(x21,y12)$$

Each of these pair of coordinates represent the top-left and bottom-right coordinates of the rectangles respectively.

Figure 31:
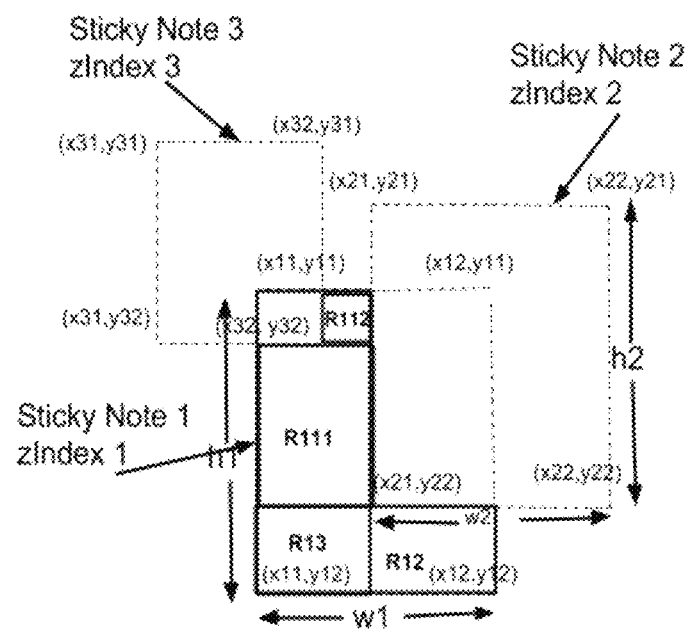
FIG. 31 is a detail line illustration of multiple mobile electronic display notes in an overlapping configuration and showing how choosing one rectangle among many options can bring a note forward, on top of the adjacent notes.

At each pass, the next overlapping mobile electronic display note is matched against each of the rectangles obtained in the previous pass and if the next mobile electronic display note overlaps with either of these rectangles, the rectangle is removed from the list of rectangles to be compared and the new rectangles obtained are added to the list of rectangles to be compared in the next pass:

Referring now to FIG. 31 which shows a detail line illustration of multiple mobile electronic display notes in an overlapping configuration and showing how choosing one rectangle among many options can bring a note forward, on top of the adjacent notes.

In the example above the next mobile electronic display note, (mobile electronic display note 3) is matched against R1 and the following 2 rectangles are obtained:

$$R111=(x11,y32)(x21,y22)$$

$$R112=(x32,y11)(x21,y32)$$

Finally any one of the remaining rectangles is chosen and is used as a parameter to trigger the Tap Virtual Event. This brings the mobile electronic display note forward.

A Tap Virtual Event is then triggered on the Edit Icon which maximizes the note.

Each line of the note is highlighted, converted to a Semantic Message Format using the Semantic Message Converter and read out to the user.

Example

Figure 32:
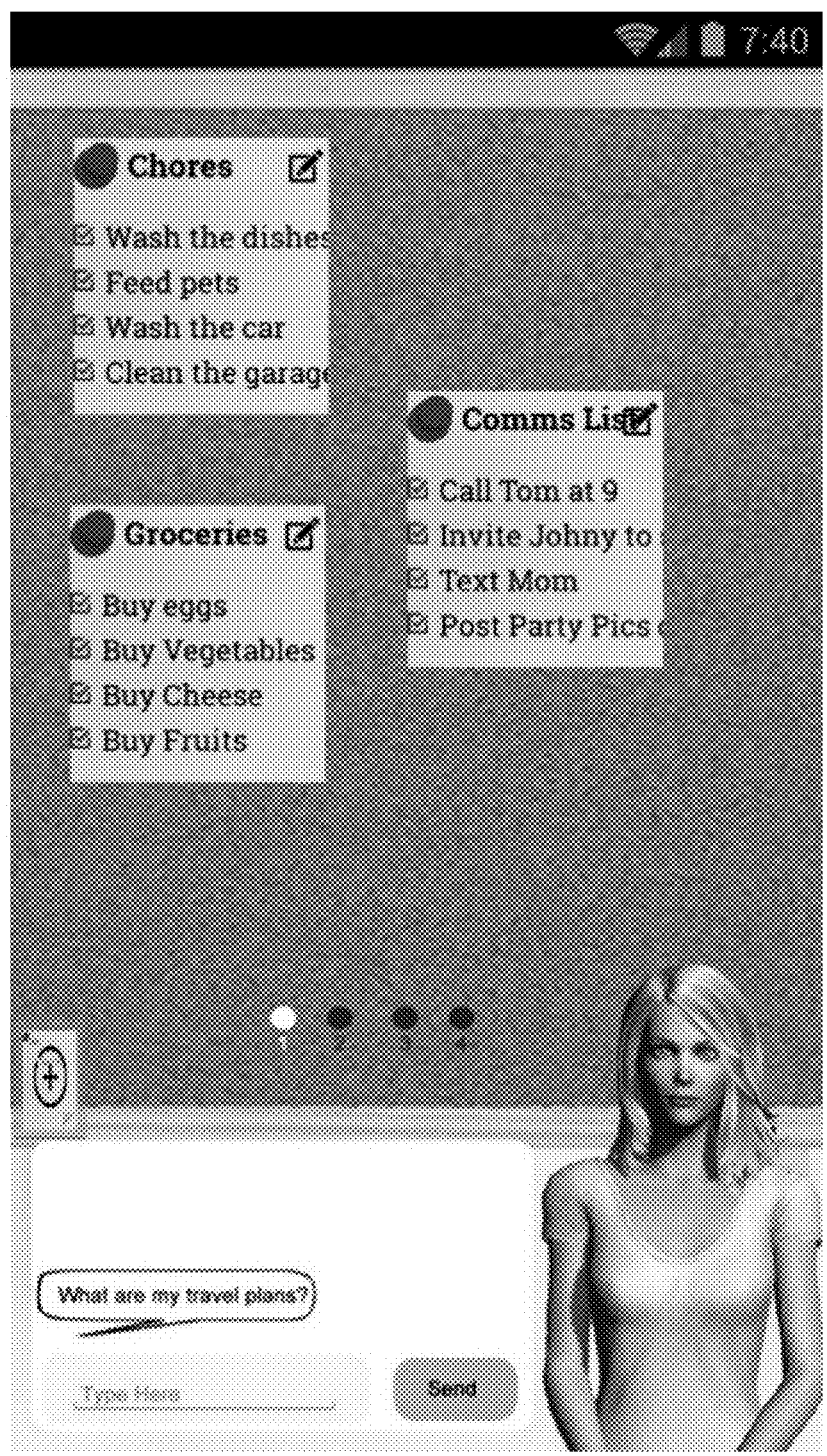
FIG. 32 is an illustrative representation of mobile electronic display notes on a Note Graphical User Interface (NGUI) showing intelligent agent interacting with a user and finding a specific note after processing verbal user input.

Referring now to FIG. 32 which shows an illustrative representation of mobile electronic display notes on a Note Graphical User Interface (NGUI) showing intelligent agent interacting with a user and finding a specific note after processing verbal user input.

If the user asks, "What are my travel plans?"

The NLP Engine will understand that "travel plans" refers to the "travel" mobile electronic display note.

Intelligent Interactive Agent then uses the mobile electronic display note Locator module to find the location of the "Travel" mobile electronic display note.

Assuming it finds the mobile electronic display note on the 2rd Page (PN) and the user is on the 1st Page (PC) of the Note Graphical User Interface (NGUI) Manager.

*PS=PN−PC* since *PN>PC*

*PS=3−1*

Intelligent Interactive Agent scrolls 2 pages to the left. Which means it plays the page scroll animation 2 times to swipe from right-to-left. Based on the calculated swipe-from Swf and swipe-to Swt locations.

Figures 33A, 33B:
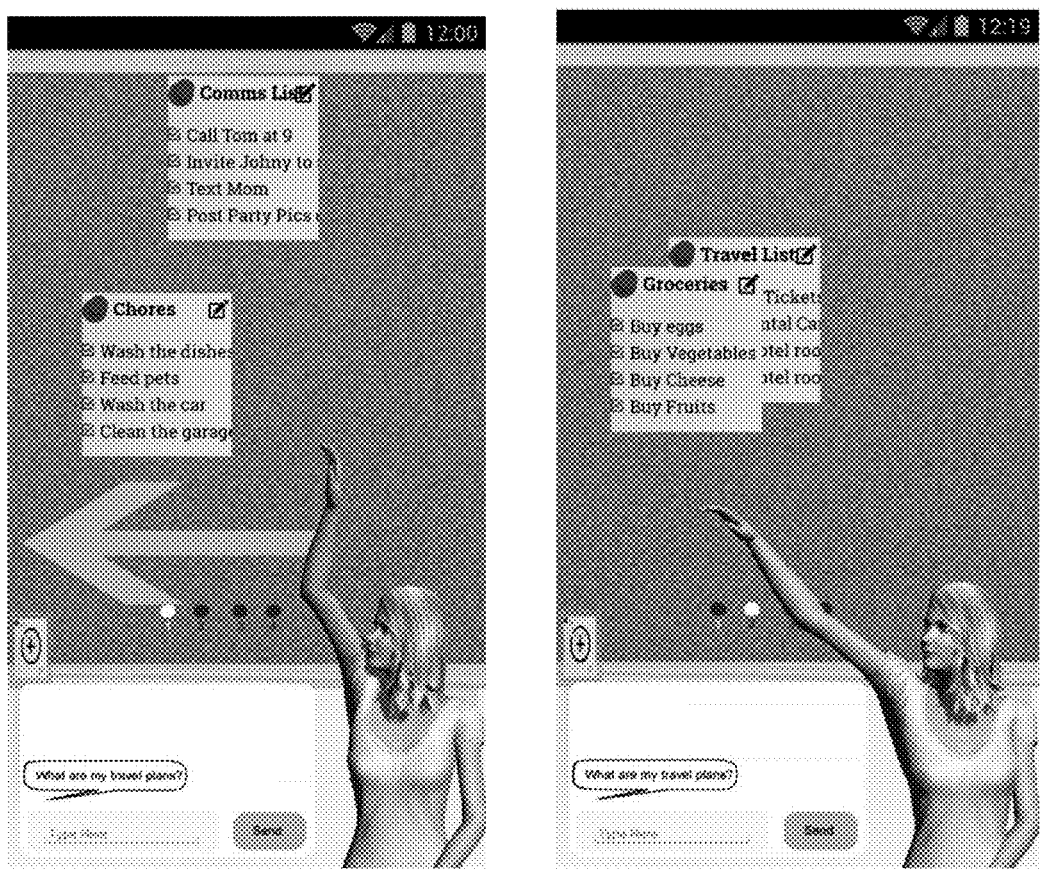
FIGS. 33a and 33b are a pair of illustrative representations of Note Graphical User Interface (NGUI) containers of mobile electronic display notes showing intelligent agent performing as graphic animation a swipe movement to expose the mobile electronic display note that is the subject of the user request.

Referring now to FIG. 33A and FIG. 33B which show a pair of illustrative representations of Note Graphical User Interface (NGUI) containers of mobile electronic display notes showing intelligent agent performing as graphic animation a swipe movement to expose the mobile electronic display note that is the subject of the user request.

The Window Manager checks if there are any mobile electronic display notes overlapping the "Travel" mobile electronic display note.

Since there is a mobile electronic display note overlapping the "Travel" mobile electronic display note, the exposed region in the form of 3 rectangles are found.

Figure 34:
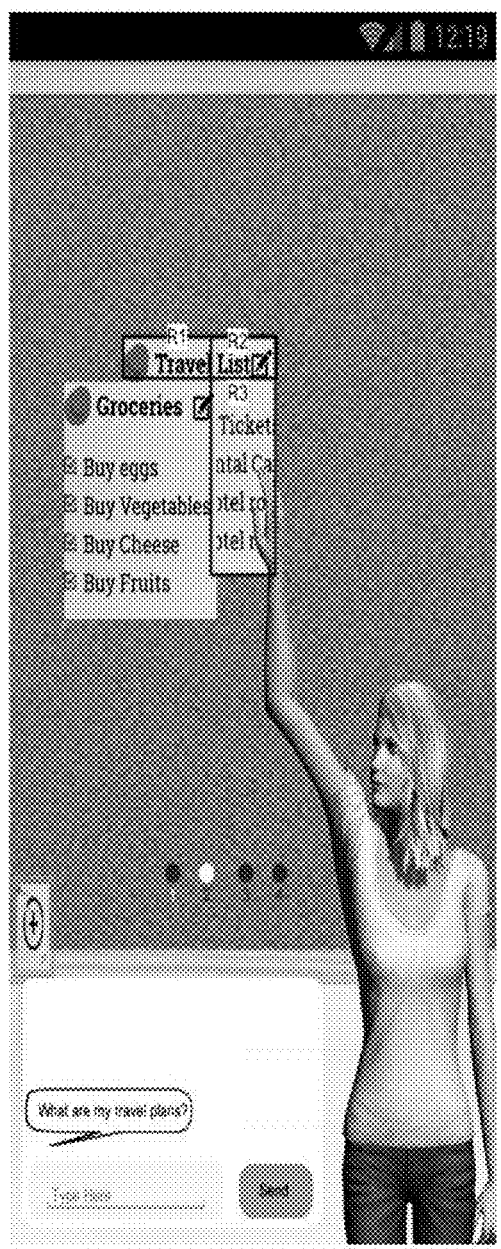
FIG. 34 is an illustrative representation of mobile electronic display notes on a Note Graphical User Interface (NGUI) showing the intelligent agent using a tap animation on an exposed region of the mobile electronic display note to bring the note forward.

Referring now to FIG. 34 which shows an illustrative representation of mobile electronic display notes on a Note Graphical User Interface (NGUI) showing the intelligent agent using a tap animation on an exposed region of the mobile electronic display note to bring the note forward.

R3 is then chosen and the Tap animation is played to bring the mobile electronic display note to the front.

Intelligent Interactive Agent then taps on the Edit Icon to maximize the note.

Figures 35A, 35B:
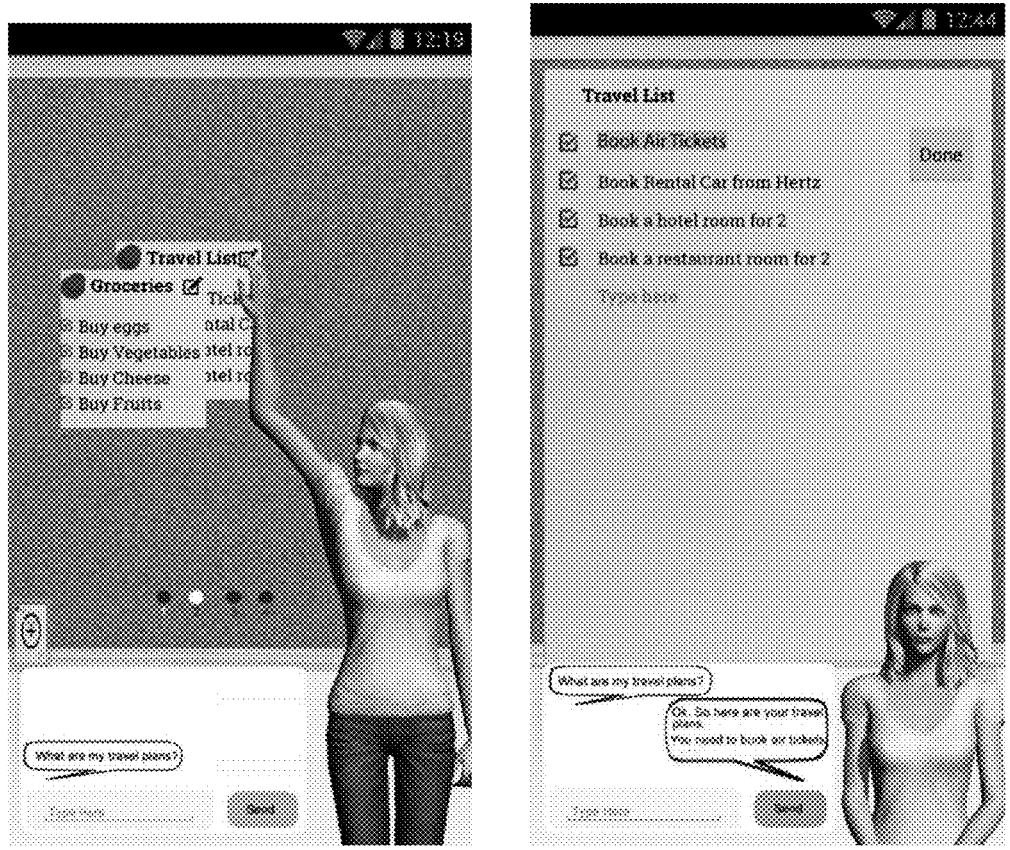
FIGS. 35a and 35b are a pair of illustrative representations of Note Graphical User Interface (NGUI) containers of mobile electronic display notes showing intelligent agent performing as graphic animation to maximize the desired note and which is synchronized with conversion of text to speech so the note is read aloud to the user.

Referring now to FIG. 35A AND 35B which show a pair of illustrative representations of Note Graphical User Interface (NGUI) containers of mobile electronic display notes showing intelligent agent performing as graphic animation to maximize the desired note and which is synchronized with conversion of text to speech so the note is read aloud to the user.

Finally, it uses the Semantic Message Converter to convert the Note's text from 3rd person to 2nd person as:

OK. So here are your travel plans:
11. You need to book air tickets.
12. You need to book a Rental Car from Hertz.
13. You need to book a hotel room for 2 and
14. You need to book a restaurant for 2

And begins to read the note highlighting the content being read.

Feature #5.

Natural Language Search.

The user can ask Intelligent Interactive Agent questions about data contained within mobile electronic display notes.

For example, the user may ask Intelligent Interactive Agent "Who am I calling today after 7?" Intelligent Interactive Agent does a search and replies with notes from the "Communication" mobile electronic display note after filtering it against the time parameter "7" which depending on the current time, before 7 AM or between 8 AM and 7 PM would mean either "Who am I calling today after 7 AM" or "Who am I calling today after 7 PM".

This process is depicted in the flowchart below and described thereafter.

Figure 36:
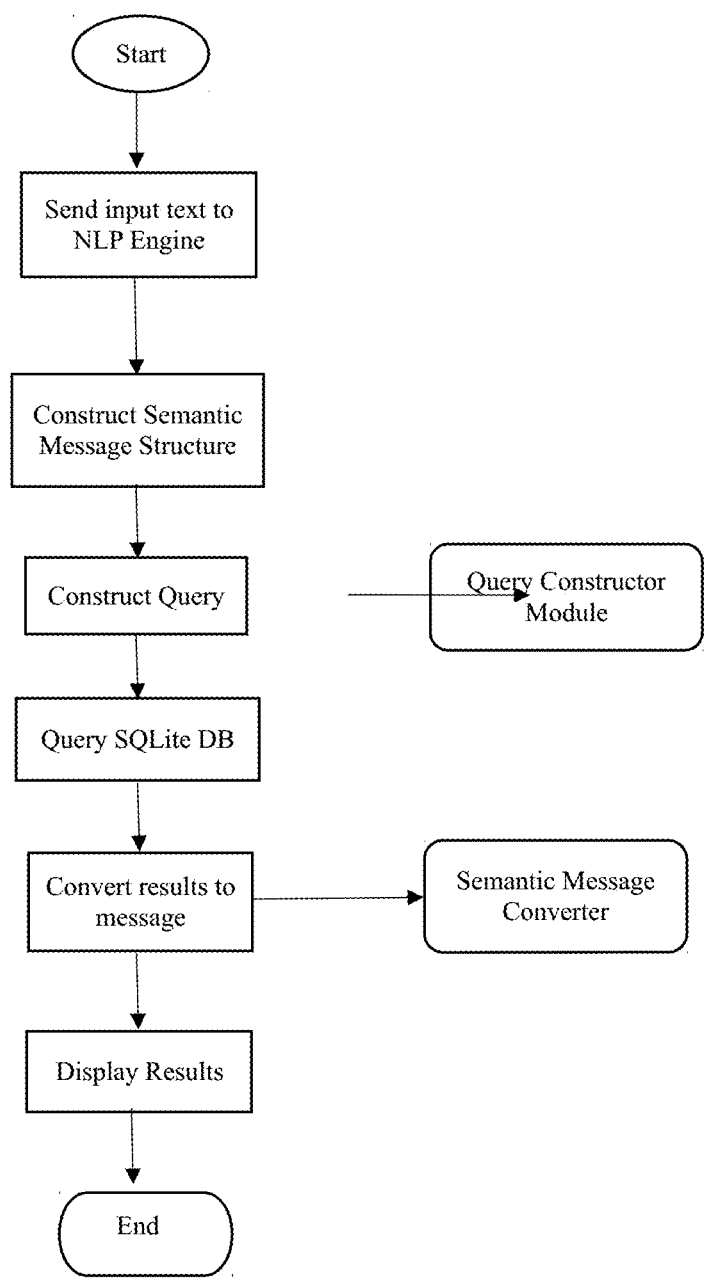
FIG. 36 is a functional block diagram showing one embodiment of natural language search and processing of text-to-speech and speech-to-text interactions between a user and an intelligent agent.

Referring now to FIG. 36 which shows a functional block diagram showing one embodiment of natural language search and processing of text-to-speech and speech-to-text interactions between a user and an intelligent agent.

The Input Text is sent to the NLP Engine which recognizes this as a question and constructs a Semantic Message Structure. A Semantic Message Structure for buying a product is given below.

Typically, the user is interested in one or more of these fields and the fields that the user is interested in are marked as <query>

The Query Constructor Module uses this Semantic Message Structure to construct a query and run it against the local SQLite Database which stores all the mobile electronic display notes.

The Results along with the Semantic Message Structure are given to the Semantic Message Converter which converts the results to a sentence like, "You are buying these products" The content of the mobile electronic display note is filtered to only show the products that are being bought.

For example if the content was "Buy bananas, Buy Carrots" then this would be converted to "Bananas and Carrots".

The result is then displayed and read out to the user.

For example:

If the user asks, "What groceries am I buying today evening from Safeway?"

Figure 37:
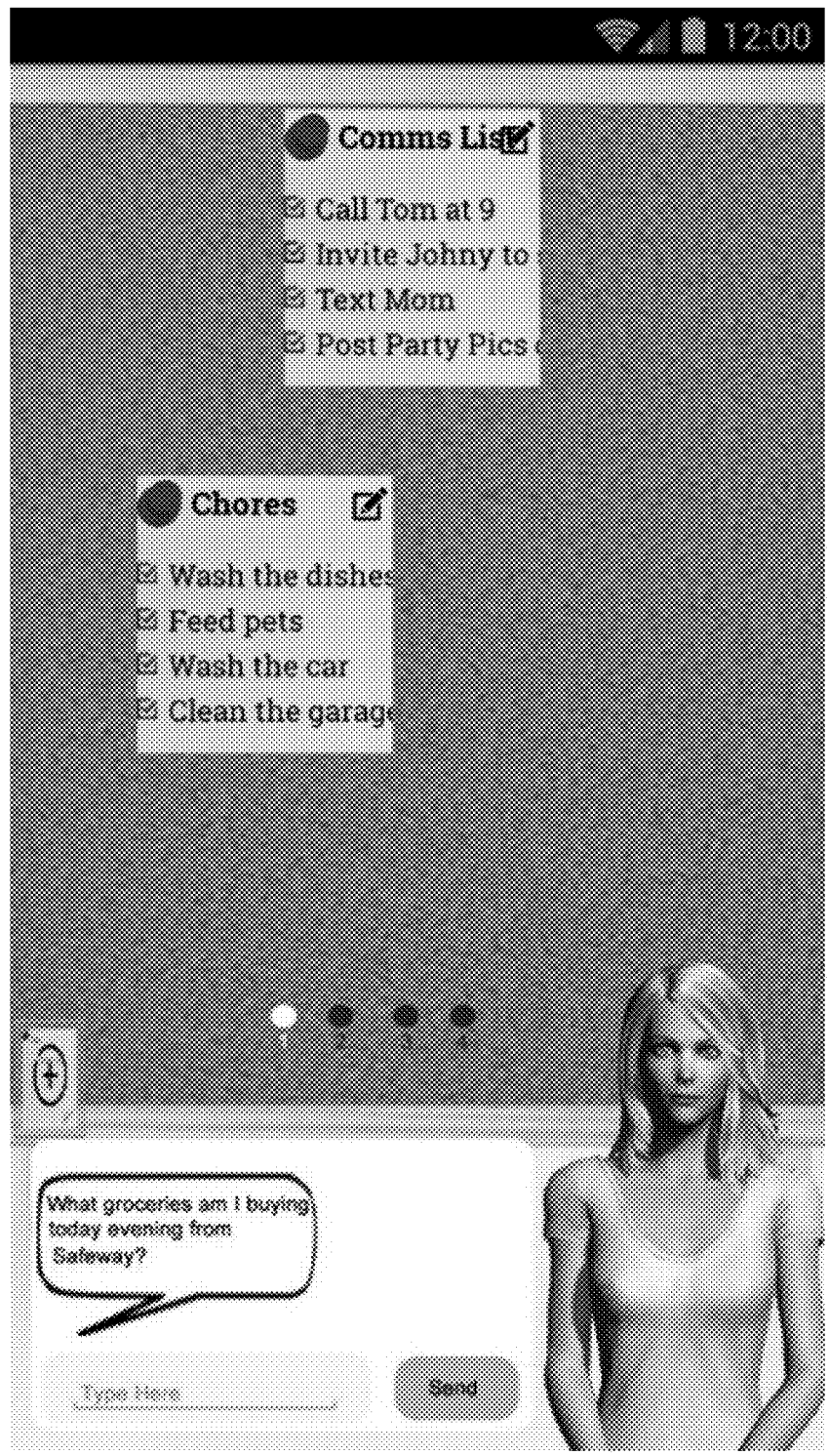

Referring now to FIG. 37 which shows an illustrative representation of a Note Graphical User Interface (NGUI) container of mobile electronic display notes showing intelligent agent having navigated to the section of the Note Graphical User Interface (NGUI) containing the mobile electronic display note that the user searched for.

The NLP Engine understands that this is a question and constructs the Semantic Message Structure below:

Action: buy
Product: <query>
Product Type: groceries
Shop: Safeway
Date: today
Time: evening The product field is the one that the user is interested in and is marked as <query>

The Query Constructor Module uses this Semantic Message Structure to formulate the query that finds all mobile electronic display notes that fulfil these parameters.

The Semantic Message Converter retrieves the results and using the Semantic Message Structure prepares the results in the form of a sentence for Intelligent Interactive Agent to speak.

Intelligent Interactive Agent displays and reads out the results.

Figure 38:
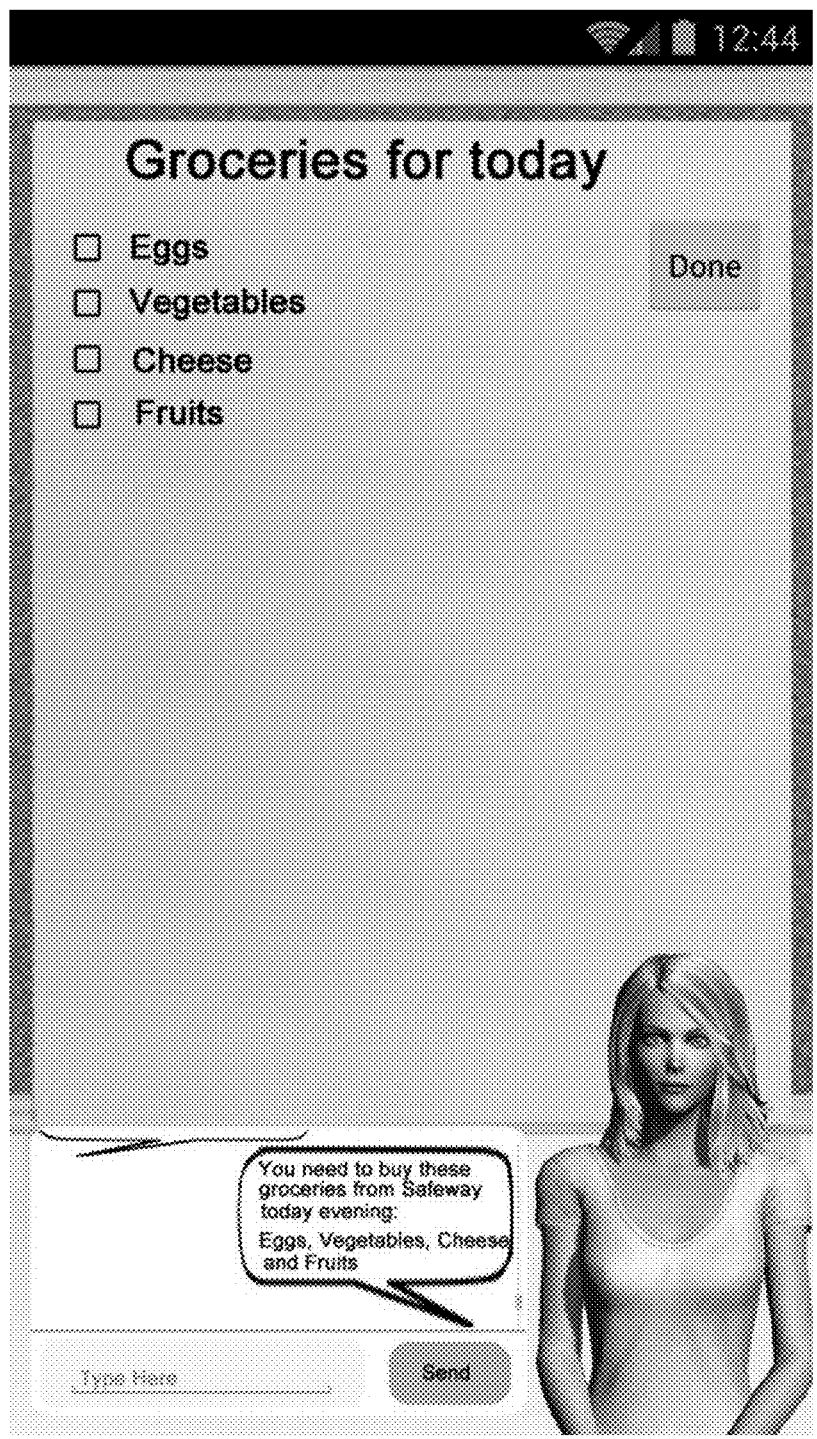
FIG. 38 is a detail of a maximized mobile electronic display note in response to a query interaction between a user and an intelligent agent.

Referring now to FIG. 38 which shows a detail of a maximized mobile electronic display note in response to a query interaction between a user and an intelligent agent.

Server Side Architecture (Intelli-Agent Artificial Intelligence (AI) Engine)

Figure 39:
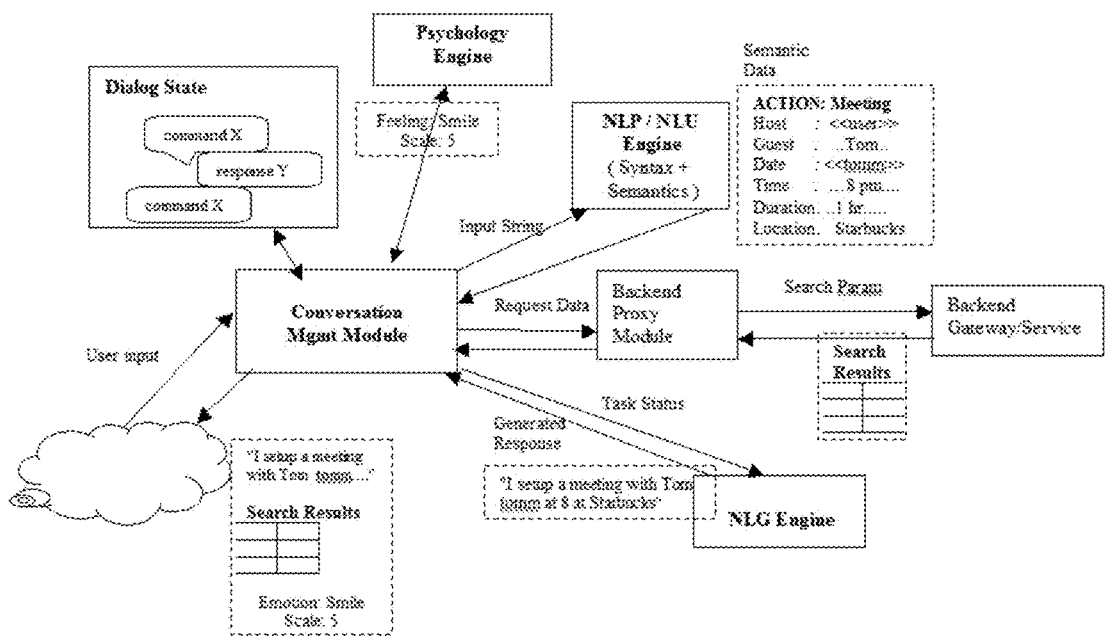
FIG. 39 is an illustration of server side technical architecture (AI) that explains the underlying mechanism of the Artificial Intelligence Engine called Intelli-Agent and shows that this Intelli-Agent accepts a text input and generates a Meaning Representation Structure in the form of Concepts/Entities and Actions managed by a Conversation Management Module that receives user input and interacts with a Dialog State Module, a Psychology Engine Module, an NLP/NLU Engine, an NLG Engine, and a Back-end Proxy Module connected to a Backend Gateway and Service.
Figure 40:
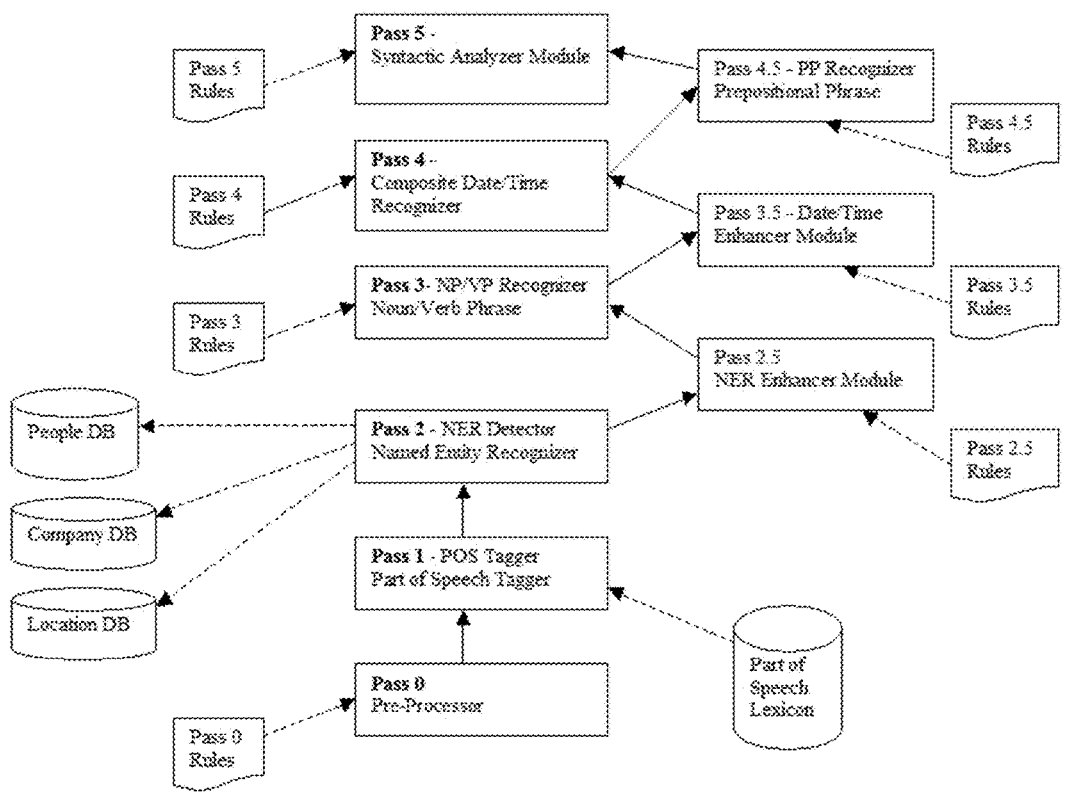
FIG. 40 is an illustration of server side technical architecture (AI) that explains the underlying mechanism of the Artificial Intelligence Engine called Intelli-Agent and shows that this Intelli-Agent accepts a text input and generates a Meaning Representation Structure in the form of Concepts/Entities and Actions and shows logic of pre-processor Pass 0 Rules transmitting input to Pass 1 for a POS tag, which transmits to Pass 2 the NER detector. Pass 2 connects to a People database, company database, a location database, and transmits at Pass 2.5 to an NER Enhancer Module, which transmits to Pass 3 NP/VP recognizer. Pass 3 is further enhanced at Pass 3.5 the Date/Time Enhancer module, which transmits modified input to Pass 4 Date Time recognizer, which transmit to Pass 4.5 Prepositional Phrase recognizer, and the Pass 0 to Pass 4.5 modified input is finally transmitted to Pass 5 the syntactic analyzer module.

Referring now to FIG. 39 and FIG. 40, the Technical Architecture that explains the underlying mechanism of the Artificial Intelligence Engine called Intelli-Agent is shown, and this Intelli-Agent accepts a text input and generates a Meaning Representation Structure in the form of Concepts/ Entities and Actions.

If the input text contains a Command from the user, It also performs the requested Operation by gathering all the required Search Criteria parameters using a multi step Conversation Management module and then obtains the results accordingly and displays it to the user in a multi modal user interface. The core module responsible for the Language Processing and Understanding tasks are carried out by the NLP Engine Component of the Intelli-Agent Framework. Furthermore the Agent Framework maintains its mental states and behavioral states in the Psychology Engine and updates them while interacting with the users to perform the requested operations.

Consider a user entering an input text (by means of a spoken command or by typing into an input device) and instructing the Intelligent Agent to schedule a meeting e.g. "set up a meeting with Tom at Starbucks tomm at 8 pm for 1 hour".

The sequence of steps that follows is explained in FIG. 39: Artificial Intelligence Engine (Technical Architecture).

The process is explained in each step as follows

The user enters the input string by means of a spoken command or by typing via a keyboard into an input device. The user can simply speak the input sentence in the form of a voice command on a client device which then converts the voice input to text by means of a Automatic Speech Recognition (ASR) module or the user can simply type in the input text through the a keyboard (onscreen/externally attached).

The server receives the user input and sends it to the Conversation Management module.

Conversation Management Module

The Conversation Management Module stores the User Session (e.g. the multi step on-going conversation between the user and the intelligent agent with regards to a operation requested by the user e.g. setting up meetings, searching flights, checking weather etc)

The Conversation Management can start a new session as soon as it senses a command input from the user e.g. if the user says "I want you to set up a meeting for me". This input by itself is not complete. (because there are certain basic parameters needed e.g. guest name, a meeting venue, a date/time etc and optionally a meeting duration etc)

This will trigger a user dialog session to be initiated by the Conversation Management Module which include a step by step procedure to ask questions for the unspecified parameters. (the user can input multiple unspecified parameters in 1 turn).

However if the user specifies a command with all the required parameters in 1 line.

"set up a meeting with Tom at Starbucks tomm at 8 pm for 1 hour", then the Conversation management module doesn't maintain a session and considers it a spot request with all the sufficient parameters to perform the requested operation. These spot request parameters are directly passed to the NLP/NLU Engine Natural Language Processing/Understanding Engine (NLP/NLU Engine)

The NLP/NLU Engine (Natural Language Processing Engine) is component that does the Natural language processing by following a Multi pass process. (as described below)

The NLP/NLU Engine analyzes the user input in its multiple passes (pass 1, pass 2, pass 2.5, pass 3, pass 3.5, pass 4, pass 4.5, pass 5, Semantic Analysis) to determine the Syntactic Tree Structure and the Semantic Analysis (i.e. the Semantic Action and its parameters) corresponding to the user input.

The Data identified by the NLP/NLU Engine is then transferred to the Conversation Management module which compares the status of the task to the user input and determines the new status of the task. For example, if the Conversation Management module is currently expecting a Location from the user and the user specifies an Coffee shop (e.g. Starbucks), then it could be determined that the user has specified the Location. Therefore, the step to retrieve the Location is rendered complete.

Backend Proxy Module, Backend Gateway/Service

Upon receiving the Semantic Action (e.g. MEETING, TRAVEL etc) and all the Parameters (either by means of a single sentence command or by means of a dialog involving multiple request/response cycles) the search criteria is sent to the Backend Proxy Module The Backend Proxy Module receives the Action and it's parameters and converts to a form understandable by the Backend Gateway (e.g. a Travel Gateway, Calendaring System, e-commerce Gateway etc)

The Backend gateway receives the data and gives out the results for the query.

e.g. If the user wanted to Search flights from A to B on Date D at Time T, then the travel gateway responds back with the Flight Results Data including various legs of the itinerary, total cost, date and time etc). If the user wanted to list the schedule for Person P at Date T, then the list of Meetings (along with Attendees, Venue, Date/Time etc is returned back)

This Backend Results data is then received back by the Backend Module which then converts it to the form understandable by the client and sends back to the Conversation Management module.

Natural Language Generation Engine (NLG Engine)

The Conversation Management module delegates the Natural language generation responsibility (i.e. generating a simple English sentence as a response) to Natural Language Generation (NLG) Engine. The NLG engine determines the kind of response that needs to be sent back to the user such as ("I am sorry, I could not setup a meeting with Tom on this particular date" or "I found 125 flights from X to Y on Z date")

The NLG engine identifies the sentence template based on the purpose of the message as well as the details of the response e.g. subject, verb, objects to be used for the sentence and generates a fully constructed sentence as a response. The generated response sentence is sent back to the Conversation Management module.

Psychology Engine (Changes in Behavioral State and expressing Feelings)

The behavioral states of the intelligent Agent get updated in the Psychology Engine. Also the Agent expresses its feelings by means of behavior states reflected as facial expressions using dynamically controlled 3D Animation.

a. Depending on the meaning of the user input e.g. intended operation, user preference, user behavioral states, user demands and requirements etc, (e.g. If the user responds with a time sensitive request in a angry tone indicating urgency, the intelligent Agent might get nervous or concerned and the mood i.e. behavioral state gets affected.)

b. Depending on the performance of the Intelligent Agent as compared to bare minimum results expected. (e.g. if the user wants the agent to search flights and the agent is not able to find any flights because the backend gateway is unavailable or slow, or if the flights meeting the selection criteria are not available, then its very embarrassing for the Agent. i.e. behavioral state gets affected.)

Results Consolidation

Conversation Management module packages the following and sends it to the server 1. Natural Language Generation response i.e. generated response in plain English form understandable by the user 2. Operation Status/Search results from the Backend Gateway/Service.

3. Feelings Response: The behavioral state and the intensity/extent of such a state (e.g. if the behavior is anger and the intensity is 5 on a scale of 1 to 5, then it means the agent is extremely angry).

Rendering the Results on the Client Device

The server then responds to the client device with Search results/Status and the response sentence along with behavioral state/intensity.

On the client device, the following things are displayed

1. The generated response as a English sentence is displayed in the chat window in a chronological manner.

2. The Operation/results are shown in a tabular display.

3. The behavioral state (confusion, anger, surprise, happiness, fear, embarrassment) along with its intensity (scale of 1 to 5) are rendered on the face of the Intelligent Agent as a Facial Expression on a 3D Mesh. The intensity of the behavioral state gets programmatically modified based on the intensity value by dynamically i.e. programmatically adjusting the vertices on face (3D mesh) of the intelligent agent using morphing techniques.

The users sees the output and speaks the next input sentence and the conversation continues.

Natural Language Processing (NLP)/Natural Language Understanding (NLU)

The NLP/NLU Engine component contains a Syntactic Parser and a Semantic Analyzer.

FIG. 40 shows the underlying mechanism of the Syntactic Parser.

Multi Pass Processing—Syntactic Parser

The input string is processed by the Syntactic parser by a series of passes

1. Pass 0/Pre-processor: The input string passes through the preprocessor. This is the pass where number detection happens. This happens even before Parts of Speech is identified so that the future passes are ready to handle a relatively consolidated and standardized input data instead of dealing with raw data. e.g. is the input contains " . . . three hundred and forty nine dollars blah blah", the preprocessor converts it to " . . . 349 dollars . . . blah blah"

2. The Pass1 is where the POSTagger (i.e. Part of Speech Tagger) starts converting each input word/token into its corresponding Part of Speech. The recognized words are assigned a part of speech type (POSType i.e. a Part of Speech Types such as NN for common noun, NNP for proper noun, VB for verbs, JJ for adjective as per the NLP standard naming conventions) where as the unrecognizable words such as proper noun tokens (e.g. name of people, cities etc) are considered to be unknowns (UNKs). The assignment of POSTypes to every token is therefore completed at the end of this pass.

3. Pass 2 is Named Entity Recognition (NER), where Named Entities (i.e. proper nouns) that represent Companies, Locations (state, country, city, airport, hotels etc.), Person names (e.g. Jack, Joe, Mr. Smith) and Brand names related to things (e.g. Samsung, Sony etc) are identified 4. Pass 2.5 is where the NER is enhanced to produce better results. This pass uses common sense logic for Composite Named entities (e.g. Hilton Chicago is composed of two tokens i. "Hilton" which is a COMPANY (i.e. chain of hotels) and ii. "Chicago" which is interpreted at Pass 2 as a CITY (located in State of Illinois). But together "Hilton Chicago" represents a HOTEL located in Chicago, Ill. and that is owned/franchised by the "Hilton Group of Hotels" and has a specific address. In the same way Airport names consist of Person Names and City names. e.g. Baltimore Washington Thurgood Marshall represents BWI Airport but the tokens inside mean something different (e.g. Baltimore is a city, Thurgood Marshall is a person name, Washington is a Metropolitan Area.)

5. Pass 3 and Pass 3.5 are used to identify Noun Phrases (NP). To elaborate, this is where specific phrases for expressions such as units of measurement (this includes currency ("Canadian dollars"=>CAD), length, speed, distance etc.) along with simple expressions of date (e.g. "30th of December this year"=>12/30/2015) and time ("10 in the morning"=>10 a.m.) are recognized.

6. Pass 4 has the ability to deal with extremely Complex expressions of Date and Time. A classic example for this would be "at 10 on the 2nd Sunday of January during the morning hours". This is a Composite Date/Time objects represents a specific date/time combination These kinds of complex expressions are dealt with in Pass 4

7. Pass 4.5 works on the identification of Prepositional Phrase (PP). This means that phrases that contain information regarding the sentence are identified. For instance, a Prepositional Phrase would be such as "from New York City" which gives an indication that New York City is a Location mentioned and "from" is the preposition that would give an indication of what kind of role the location is playing e.g. Source or Destination. Sometimes the prepositional phrase is included as a part of post modifier (e.g. "departing from LAX on 5th December" vs "arriving at JFK on 5th December" can mean completely different things as far as the dates are concerned although the preposition used before the date is the same i.e. on). Hence the context of the region of the syntactic tree in which the prepositional phrase is located is critical to identifying the meaning.

8. Pass 5 is where the Syntactic Analysis happens. The sentence as a whole is broken down and a tree is constructed with Verb Phrases (VP) at the top followed by Verbs (NP) and Noun Phrases (NP) and Prepositional Phrases (PP) as the next level nodes that provide further information about the subject, verb and object of the input sentence. This is done by a set of syntactic rules established depending on the Syntactic Frame of the Sentence.

9. The final phase is the semantic conversion where the Syntactic tree is then examined further to identify the Semantic Actions (e.g. TRAVEL, NAVIGATE, MEET) pertaining to the core meaning/purpose of the input sentence and further identifying the parameters or attributes that are required to perform the Semantic Action e.g. MEET is a Semantic Action representing a Meeting. Typically Meetings are organized by a HOST along with one or more GUEST(s) at a LOCATION on a certain DATE at a certain TIME. So these parameters becomes the fields in the Semantic Action.

INCORPORATION AND STATEMENT OF EQUIVALENTS

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

The invention claimed is:

1. A Note Graphical User Interface (NGUI) application for handling electronic notes in a mobile device, comprising:
a memory storing one or more programs configured to be executed by one or more processors, the one or more programs including instructions for:
saving mobile electronic display note rendering data on a frame by frame basis to memory;
providing an Intelligent Interactive Agent as a graphic animation to a user, said Intelligent Interactive Agent having modules for receiving and processing verbal commands from the user;
wherein the Intelligent Interactive Agent operates the GUI from the verbal commands;
wherein the intelligent interactive agent executes GUI operations comprising tapping, swiping, pinching, searching for text, entering text, and displaying retrieved content, in the one or more mobile electronic display notes displayed in the container display matrix;
wherein the graphic animation is rendered to project a tapping gesture as part of the tapping operation;
wherein the graphic animation is rendered to project a swiping gesture as part of the swiping operation;
wherein the graphic animation is rendered to project a pinching gesture as part of the pinching operation;
wherein the graphic animation is rendered to project a searching gesture as part of the searching operation;
wherein the graphic animation is rendered to project a text entry gesture as part of the text entry operation;
wherein the graphic animation is rendered to project a content displaying gesture as part of the content displaying operation;
wherein the human-like animation comprises matched human-like characteristics, said characteristics comprising a human-like facial proportions, a human-like appearance, a human-like voice, and human-like gestures; and
providing rendering of one or more mobile electronic display notes in a container display matrix while performing a drag & drop gesture by a user;
wherein during a Drag gesture of the drag & drop gesture, the one or more mobile electronic display notes are rendered at frame rate that is calculated dynamically;
wherein a plurality of checkpoints are set up in the container display matrix at every 1/Tth of a second, where T is the number of time units, and the checkpoints are assigned a value of milestones within a second;
wherein at the end of every milestone Mi where i ranges from 1 to T, a computation is performed as to how many frames/scenes to render to show pre-determined animation effect within that milestone;
wherein at every checkpoint, a decision is made on the number of frames NF to render within that milestone depending on the distance moved by the user during that milestone Di assuming a maximum distance Mpx that the user can move in the checkpoint (1/Tth of a second):

$$NF = \text{ceil}((Di/Mpx) \times (Nmax/T));$$

wherein T is 10 initially and Mpx is 100 pixels defining that the user can initially move a maximum distance of 100 pixels in 1/10th of a second, and 100 ms is the initial time to render a maximum number of frames Nmax;
wherein Nmax is dynamically the maximum number of frames that can be rendered in one second; and
wherein the (Di/Mpx) is the ratio of Di to the maximum distance that the user can move in 1/Tth of a second.

2. A method of using the application of claim 1 to render one or more mobile electronic display notes, the steps comprising:
(i) rendering one or more mobile electronic display notes on a frame by frame basis in a container display matrix;
(ii) calculating a frame rate that the mobile electronic display notes are rendered and saving the frame to memory;
(iii) receiving a drag and drop gesture from a user using a touchscreen and calculating a plurality of measurements of distance traveled over specified time periods;
(iv) dynamically adjusting the frame by frame rendering rate based on the plurality of measurements of distance traveled over specified time periods,
wherein the distance traveled is measured in pixels,
wherein the frame by frame rendering rate is increased when the drag and drop gesture is accelerating, the frame by frame rendering rate is decreased when the drag and drop gesture is decelerating, and the frame by frame rendering rate is unchanged when the drag and drop gesture is stationary,
wherein accelerating is calculated and determined when two or more of the plurality of measurements of distance traveled over specified time periods are decreasing nonlinearly, and
wherein decelerating is calculated and determined when two or more of the plurality of measurements of distance traveled over specified time periods are increasing nonlinearly, and
wherein stationary is calculated and determined when two or more of the plurality of measurements of distance traveled over specified periods are unchanged.

3. The Note Graphical User Interface (NGUI) application of claim 1, further comprising instructions for:
computing overlap of delta regions of a plurality of mobile electronic display notes displayed in a container display matrix, wherein the delta regions are defined as Area Revealed and Area Concealed of the mobile electronic display notes; and
using the computation to update a relative depth measurement of the mobile electronic display notes defined as Z-indexs of the plurality of mobile electronic display notes computed in the previous animation frame/scene;
wherein the computation provides an optimized and high performance updating of z-index;
wherein an updated Z-index optimizes the rendering time leading to high performance;
wherein computation avoids the redundancy of calculating the overlap of the current mobile electronic display note being dragged across the screen as well as the rest of the mobile electronic display notes present on the Note Graphical User Interface.

4. A method of using the application of claim 3 to compute overlap of delta regions of a plurality of mobile electronic display notes displayed in a container display matrix, comprising the steps of (i) defining the delta regions as Area Revealed and Area Concealed of the mobile electronic display notes; an (ii) calculating a relative depth measurement of the mobile electronic display notes and defining the calculation as a Z-index for each of the plurality of mobile electronic display notes, wherein the computation provides an optimized and high performance updating of z-index;

wherein an updated Z-index optimizes the rendering time leading to high performance;

wherein computation avoids the redundancy of calculating the overlap of the current mobile electronic display note being dragged across the screen as well as the rest of the mobile electronic display notes present on the Note Graphical User Interface.

5. The Note Graphical User Interface (NGUI) application of claim 1, further comprising instructions for:

providing rendering of a mobile electronic display note while performing a Pinch & Zoom gesture, wherein the rendering frame rate for the mobile electronic display note is dynamically calculated during the Pinch & Zoom gesture, wherein the Pinch & Zoom gesture comprises 4 rectangles of Area Concealed in case the mobile electronic display note is expanding, and wherein the Pinch & Zoom gesture comprises 4 rectangles of Area Revealed in case the mobile electronic display note is shrinking.

6. A method of using the application of claim 5 to render a mobile electronic display note while performing a Pinch & Zoom gesture, wherein the rendering frame rate for the mobile electronic display note is dynamically calculated during the Pinch & Zoom gesture, wherein the Pinch & Zoom gesture comprises 4 rectangles of Area Concealed in case the mobile electronic display note is expanding, and wherein the Pinch & Zoom gesture comprises 4 rectangles of Area Revealed in case the mobile electronic display note is shrinking.

7. The Note Graphical User Interface (NGUI) application of claim 1, further comprising instructions for:

Mapping text input to mobile electronic display notes, wherein an NLP Engine maps a text input given by a user to a mobile electronic display note;

wherein verb words are linked to the Semantic Action;

wherein common noun words resolve to a Semantic Concept/Entity for a category; and wherein proper noun words resolve to Semantic Concept/Entity for proper items.

8. A method of using the application of claim 7 to map text in a mobile electronic display note, comprising the step of mapping user inputted text in mobile electronic display note with an NLP Engine;

wherein verb words are linked to the Semantic Action, wherein common noun words resolve to a Semantic Concept/Entity for a category, and wherein proper noun words resolve to Semantic Concept/Entity for proper items.

9. The Note Graphical User Interface (NGUI) application of claim 1, further comprising instructions for:

providing a technical architecture having the following components;

1. An Automated Overlap Detector which automatically computes overlaps between mobile electronic display notes;

2. A Virtual Event Planner which creates an Event Plan of steps that include one or more virtual events and creates user interaction parameters comprising position, distance, time, trajectory, wherein the entire plan is handed over to a Virtual Event Performer;

3. The Virtual Event Performer which co-ordinates the virtual events in the Event Plan generated by the Virtual Event Planner and executes the virtual events by pushing them into a Virtual Event Queue which will perform one or more of the following steps:

a. execute the 2nd virtual event immediately after pushing the 1st virtual event into the virtual event queue; or b. Wait for completion of execution of virtual event 1 and retrieve a notification of completion by the interpreter before moving on to virtual event 2; or c. Wait for a configured delay between performing virtual event 1 and virtual event 2;

4. A Virtual Event Interpreter which receives Virtual Events from the Virtual Event Queue and executes them on the GUI, and controls animation of a Personal Virtual Assistant to perform gestures corresponding to the Virtual Events, and notifies a Virtual Event Performer of completion of the Virtual Event; and 5. A Virtual Assistant Animation Engine which reads information contained in the Virtual Event and performs a series of animations to complement the Virtual Event, wherein in a Tap Virtual Event the Virtual Assistant Animation Engine performs the following steps: reads a Rectangular region for the Tap, Calculates a center of gravity of the Rectangular region, Performs a Rotate Body Animation to rotate towards a Note Graphical User Interface (NGUI);

Performs a Point Hand Animation to point a hand at the calculated center of gravity; and Performs a Tap Animation which shows Personal Virtual Assistant tapping the hand down like tapping down on a button.

10. A method of using the application of claim 9 to handle electronic notes in a mobile device, comprising:

computing overlaps between mobile electronic display notes using An Automated Overlap Detector, said Automated Overlap Detector comprising instructions for preforming the following steps;

creating an Event Plan of steps that include one or more virtual events and creates user interaction parameters comprising position, distance, time, trajectory using a Virtual Event Planner, wherein the entire plan is handed over to a Virtual Event Performer;

co-ordinating the virtual events in the Event Plan generated by the Virtual Event Planner using the Virtual Event Performer, and executing the virtual events by pushing them into a Virtual Event Queue which will perform one or more of the following steps:

a. execute the 2nd virtual event immediately after pushing the 1st virtual event into the virtual event queue; or b. Wait for completion of execution of virtual event 1 and retrieve a notification of completion by the interpreter before moving on to virtual event 2; or c. Wait for a configured delay between performing virtual event 1 and virtual event 2;

receiving Virtual Events from the Virtual Event Queue using a Virtual Event Interpreter, executing them on the GUI, and controlling animation of a Personal Virtual Assistant to perform gestures corresponding to the Virtual Events, and notifying the Virtual Event Performer of completion of the Virtual Event; and using a Virtual Assistant Animation Engine to read information contained in the Virtual Event and perform a series of animations to complement the Virtual Event, wherein in a Tap Virtual Event the Virtual Assistant Animation Engine performs the following steps:

reads a Rectangular region for the Tap, Calculates a center of gravity of the Rectangular region; Performs a Rotate Body Animation to rotate towards a Note Graphical User Interface (NGUI); Performs a Point Hand Animation to point a hand at the calculated center of gravity; and Performs a Tap Animation which shows Personal Virtual Assistant tapping the hand down like tapping down on a button.

11. The Note Graphical User Interface (NGUI) application of claim 1, further comprising instructions for:

providing Natural Language Search;

wherein a user can ask an intelligent agent questions about data contained within mobile electronic display notes;

wherein the intelligent agent performs a search and replies with mobile electronic display notes that satisfy pre-set search parameters.

12. A method of using the application of claim 11, comprising the following steps:

querying the intelligent interactive agent configured to provide Natural Language Search about data contained within mobile electronic display notes; and performing a search and replying with a selection of mobile electronic display notes that satisfy pre-set search parameters related to the query.

* * * * *